US012406629B2

(12) United States Patent
Cheng

(10) Patent No.: US 12,406,629 B2
(45) Date of Patent: Sep. 2, 2025

(54) METHOD OF CONTROLLING DISPLAY PANEL AND DISPLAY DRIVER CIRCUIT AND SCAN CONTROL CIRCUIT THEREOF

(71) Applicant: NOVATEK Microelectronics Corp., Hsin-Chu (TW)

(72) Inventor: Huan-Teng Cheng, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/629,944

(22) Filed: Apr. 9, 2024

(65) Prior Publication Data

US 2024/0355296 A1 Oct. 24, 2024

Related U.S. Application Data

(60) Provisional application No. 63/460,613, filed on Apr. 20, 2023.

(51) Int. Cl.
*G09G 3/3266* (2016.01)

(52) U.S. Cl.
CPC ... *G09G 3/3266* (2013.01); *G09G 2310/0286* (2013.01); *G09G 2310/08* (2013.01); *G09G 2330/021* (2013.01); *G09G 2340/0435* (2013.01)

(58) Field of Classification Search
CPC ......... G09G 3/3266; G09G 2310/0286; G09G 2310/08; G09G 2330/021; G09G 2340/0435
See application file for complete search history.

(56) References Cited

U.S. PATENT DOCUMENTS 3,329,949 A * 7/1967 Colton .................. H03K 21/08 345/215
5,757,218 A * 5/1998 Blum ....................... H03K 5/05 327/175
6,128,173 A * 10/2000 Iwasaki ................ H10D 89/811 361/111
6,292,023 B1 * 9/2001 Herrera .................. G06N 3/063 326/46
6,670,829 B1 * 12/2003 Chow ................ H03K 17/6872 326/27
7,173,473 B2 * 2/2007 Terletzki ........ H03K 19/018521 327/333
2006/0214893 A1 * 9/2006 Tseng .................. G09G 3/3233 345/82

(Continued)

FOREIGN PATENT DOCUMENTS

CN 113674699 A 11/2021

*Primary Examiner* — Sejoon Ahn
(74) *Attorney, Agent, or Firm* — Winston Hsu

(57) ABSTRACT

A method of controlling a display panel which performs a scan operation on an image frame with a first scan setting and a second scan setting includes steps of: outputting a start pulse to the display panel when starting the scan operation; outputting a clock signal to the display panel when the scan operation is in the first scan setting; stopping outputting the clock signal to the display panel when the scan operation is in the second scan setting; and restarting to output the clock signal to the display panel when the scan operation is switched to the first scan setting from the second scan setting. The first scan setting and the second scan setting are for display of the display panel.

47 Claims, 16 Drawing Sheets

(56) References Cited

U.S. PATENT DOCUMENTS

| | | | | |
|---|---|---|---|---|
| 2010/0315128 | A1* | 12/2010 | Kapoor ................ | H10D 30/832<br>326/112 |
| 2022/0148503 | A1 | 5/2022 | Seo | |

* cited by examiner

METHOD OF CONTROLLING DISPLAY PANEL AND DISPLAY DRIVER CIRCUIT AND SCAN CONTROL CIRCUIT THEREOF

CROSS REFERENCE TO RELATED APPLICATIONS

This application claims the benefit of U.S. Provisional Application No. 63/460, 613, filed on Apr. 20, 2023. The content of the application is incorporated herein by reference.

BACKGROUND OF THE INVENTION

1. Field of the Invention

The present invention relates to a method of controlling a display panel, and more particularly, to a method of controlling a display panel under multi-frequency display and related display driver circuit and scan control circuit.

2. Description of the Prior Art

Multi-frequency display (MFD) is a novel display technique which generates images with different frame rates in different areas of the display panel. Under the MFD, an image frame may be divided into one or more high frame rate (HFR) areas and one or more low frame rate (LFR) areas. For example, an area for displaying a video is preferably allocated to the HFR area, and other areas showing text content are preferably allocated to the LFR area. The MFD operations may save power consumption by reducing the refresh number of times in the LFR areas, while keeping the refresh rate to achieve satisfactory image quality in the HFR areas, where the refresh rate allocations in each image frame may be performed dynamically to be adapted to the image content.

In the HFR area, the refreshment should be performed with a scan pulse to sequentially generate scan signals to be output to the scan lines on the display panel, where the scan pulse is forwarded based on the control of a clock signal. In the prior art, in order to meet the timing requirements of dynamically and flexibly allocating the HFR areas, the clock signal should be output to the display panel continuously, regardless of whether the scan operation proceeds to the HFR area or the LFR area, to ensure that the scan pulse could be forwarded correctly. However, the MFD operation with the arrangement of the LFR areas aims at power saving when the image refreshing is unnecessary, while the clock signal is a high-frequency and high-voltage-swing signal that consumes a great amount of power. If the clock signal still toggles in the LFR areas, the power saving effect will not be perfectly achieved.

SUMMARY OF THE INVENTION

It is therefore an objective of the present invention to provide a method of controlling a display panel under multi-frequency display (MFD) and related display driver circuit and scan control circuit, where the output of the clock signal is stopped in the low frame rate (LFR) areas, in order to solve the abovementioned problem.

An embodiment of the present invention discloses a method of controlling a display panel. The display panel performs a scan operation on an image frame with a first scan setting and a second scan setting. The method comprises steps of: outputting a start pulse to the display panel when starting the scan operation; outputting a clock signal to the display panel when the scan operation is in the first scan setting; stopping outputting the clock signal to the display panel when the scan operation is in the second scan setting; and restarting to output the clock signal to the display panel when the scan operation is switched to the first scan setting from the second scan setting. The first scan setting and the second scan setting are for display of the display panel.

Another embodiment of the present invention discloses a display driver circuit for controlling a display panel. The display panel performs a scan operation on an image frame with a first scan setting and a second scan setting. The display driver circuit outputs a start pulse to the display panel when starting the scan operation, outputs a clock signal to the display panel when the scan operation is in the first scan setting, stops outputting the clock signal to the display panel when the scan operation is in the second scan setting, and restarts to output the clock signal to the display panel when the scan operation is switched to the first scan setting from the second scan setting. The first scan setting and the second scan setting are for display of the display panel.

Another embodiment of the present invention discloses a scan control circuit of a display panel. The scan control circuit comprises a plurality of scan channels and at least one pulse generator. Each of the plurality of scan channels comprises a shift register and an output enable circuit. The shift register generates a scan pulse according to a start pulse and a clock signal. The output enable circuit, coupled to the shift register, outputs a scan signal according to the scan pulse and an enable signal. Each of the at least one pulse generator is coupled to the shift register of one of the plurality of scan channels.

Another embodiment of the present invention discloses a method of controlling a display panel. The display panel performs a scan operation on an image frame with a first scan setting and a second scan setting. The method comprises steps of: outputting a start pulse to the display panel when starting the scan operation; outputting a clock signal to the display panel when the scan operation is in the first scan setting; stopping outputting the clock signal to the display panel when the scan operation is in the second scan setting; and outputting a first enable signal to the display panel. The first enable signal is in a first state when the scan operation is in the first scan setting, and the first enable signal is in a second state when the scan operation is in the second scan setting.

Another embodiment of the present invention discloses a display driver circuit for controlling a display panel. The display panel performs a scan operation on an image frame with a first scan setting and a second scan setting. The display driver circuit outputs a start pulse to the display panel when starting the scan operation, outputs a clock signal to the display panel when the scan operation is in the first scan setting, stops outputting the clock signal to the display panel when the scan operation is in the second scan setting, and outputs a first enable signal to the display panel. The first enable signal is in a first state when the scan operation is in the first scan setting, and the first enable signal is in a second state when the scan operation is in the second scan setting.

These and other objectives of the present invention will no doubt become obvious to those of ordinary skill in the art after reading the following detailed description of the preferred embodiment that is illustrated in the various figures and drawings.

DETAILED DESCRIPTION

Currently available display panels mostly apply the gate on array (GOA) technique to generate scan signals to be output to scan lines on the display panel, where a GOA circuit may be deployed at one or both sides of the display panel. A display driver circuit may output control signals, including clock signals and a start pulse, and sometimes a clear signal, to drive the GOA circuit to generate and output the scan signals. As mentioned above, in a multi-frequency display (MFD) application, an image frame may be dynamically divided into one or more high frame rate (HFR) areas and one or more low frame rate (LFR) areas. In an LFR area where panel refresh is omitted, the corresponding scan lines may be gated and the scan signal output may be disabled. The scan operations may be appropriately controlled in a series of image frames to realize the high/low frame rates at different positions of the display panel.

Figure 1:
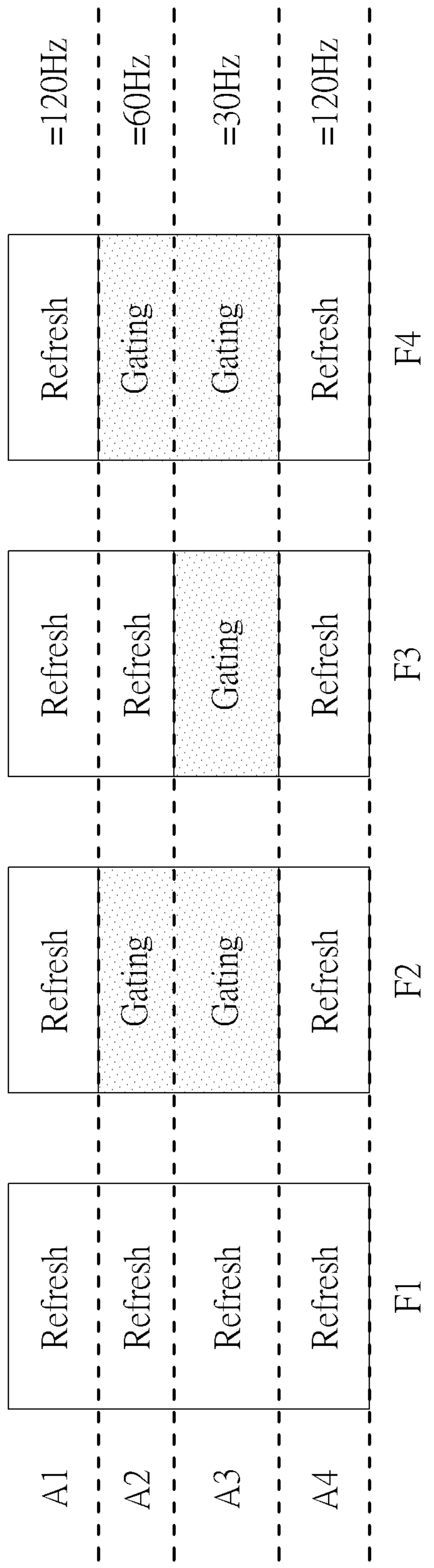
FIG. 1 illustrates the scan operations in 4 consecutive image frames to realize different frame rates in each area.

FIG. 1 illustrates the scan operations in 4 consecutive image frames F1-F4 to realize different frame rates in each area A1-A4. In the display panel, the image frame F1 is fully refreshed and the image frames F2-F4 are partially refreshed based on the frame rate allocation. More specifically, in the image frames F2 and F4, the areas A2 and A3 are allocated as LFR areas, where the scan signals are gated and thus the corresponding pixels are not refreshed, while the panel refresh is performed in the areas A1 and A4 which are allocated as HFR areas. In the image frame F3, the area A3 is allocated as an LFR area, where the scan signals are gated and thus the corresponding pixels are not refreshed, while the panel refresh is performed in the areas A1, A2 and A4 which are allocated as HFR areas. Supposing that the basic frame rate of the panel is 120 Hz, the refreshing operations may be repeatedly performed in a series of consecutive image frames as the arrangements shown in FIG. 1, to achieve lower frame rates such as 60 Hz and 30 Hz. The display driver circuit may be triggered to perform the MFD in any appropriate manner. In an embodiment, the display driver circuit may only receive partial display data in an image frame from the video source, and determine the positions allocated to the HFR areas and/or the LFR areas based on the image content. Alternatively, the display driver circuit may receive a notification from the video source that indicates which areas need to be refreshed and which areas need not to be refreshed, to determine the positions allocated to the HFR areas and/or the LFR areas.

In the prior art, although the scan signals are gated, the clock signals output to the GOA circuit would still toggle in the LFR areas. As mentioned above, the clock signals for the GOA circuit may be high-frequency and high-voltage-swing signals that consume a great amount of power. For example, as for an organic light-emitting diode (OLED) panel, the clock signals for the GOA circuit may toggle between a gate high voltage 8V and a gate low voltage −7V, and thus have a voltage swing up to 15V.

The present invention provides a novel method to stop the GOA clocks in the LFR areas under the MFD application, in order to reduce the power consumption. In the embodiments of the present invention, the display driver circuit may control the clock signals for the GOA circuit to be stopped and restarted flexibly based on the allocation of the LFR areas in each image frame.

Figure 2:
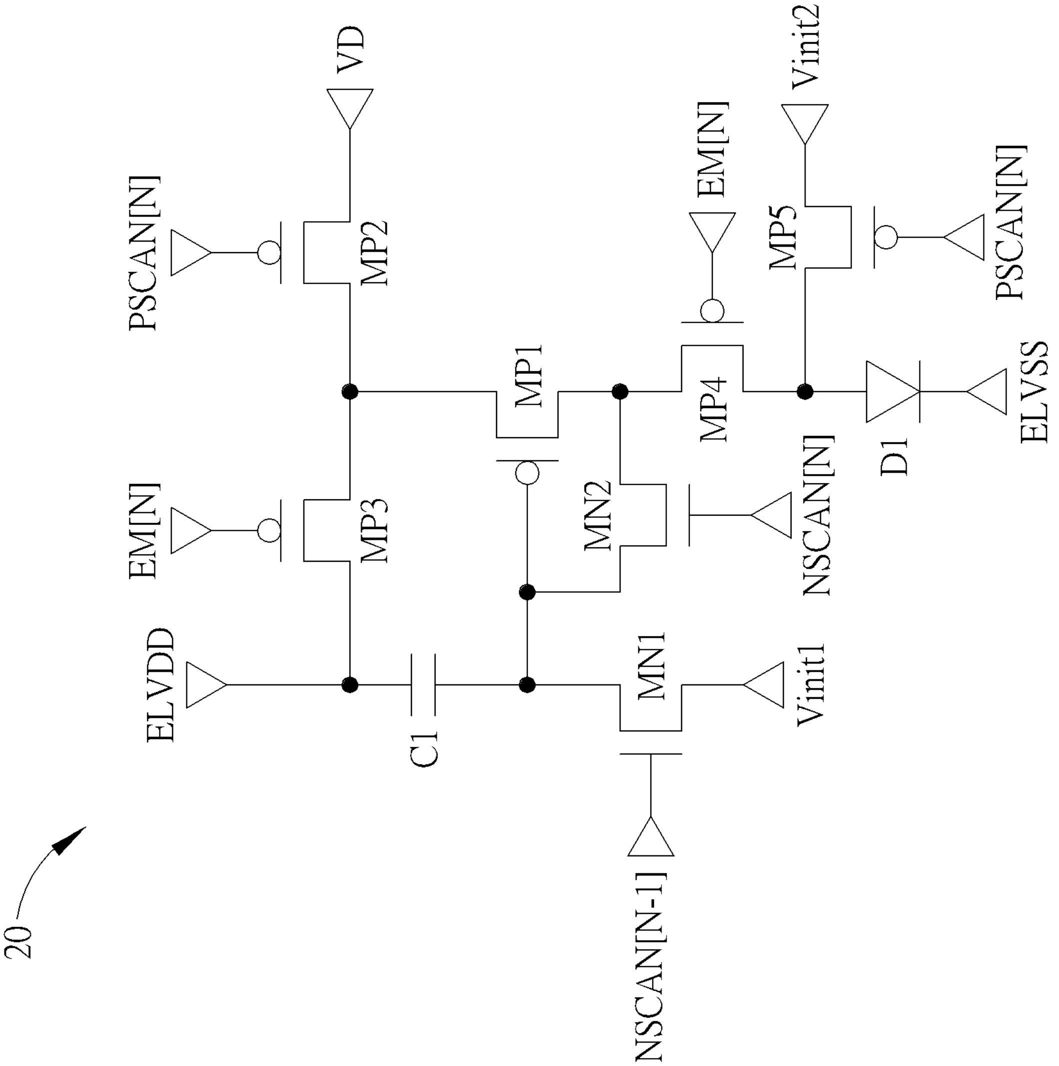
FIG. 2 is a schematic diagram of an exemplary pixel circuit of an LTPO panel.

In an embodiment, the operation of stopping the GOA clocks may be applied to a low-temperature polycrystalline oxide (LTPO) OLED panel. FIG. 2 is a schematic diagram of an exemplary pixel circuit 20 of an LTPO panel, which may be composed of an OLED D1, a capacitor C1, 5 PMOS transistors MP1-MP5, and 2 NMOS transistors MN1 and MN2. The pixel circuit 20 may be operated by receiving power supply voltages ELVDD and ELVSS, initial voltages Vinit1 and Vinit2, an emission control signal EM[N], and several scan signals (including the scan signal PSCAN[N] for the PMOS transistors MP1-MP5 and the scan signals NSCAN[N−1] and NSCAN[N] for the NMOS transistors MN1 and MN2). The OLED D1 may generate a desired brightness based on a data voltage VD received from a data line.

In this embodiment, the NMOS transistors MN1 and MN2 may be manufactured by using indium gallium zinc oxide (IGZO) or any other similar materials with the LTPO technology. Therefore, the NMOS transistors MN1 and MN2 could be fully cut off to minimize the leakage current in their off state, thereby fully isolating the leakage path of electric charges of the capacitor C1. Due to the low leakage feature, the LTPO display may support an extremely low frame rate such as 1 Hz. Note that the structure shown in FIG. 2 is merely one of various pixel circuit structures of the LTPO panel. For example, in another embodiment, there may be only one NMOS transistor, and other switches in the pixel circuit are implemented with PMOS transistors. The overall transistor count in a pixel circuit may also be different based on the requirement of pixel compensation and display operation.

Figure 3:
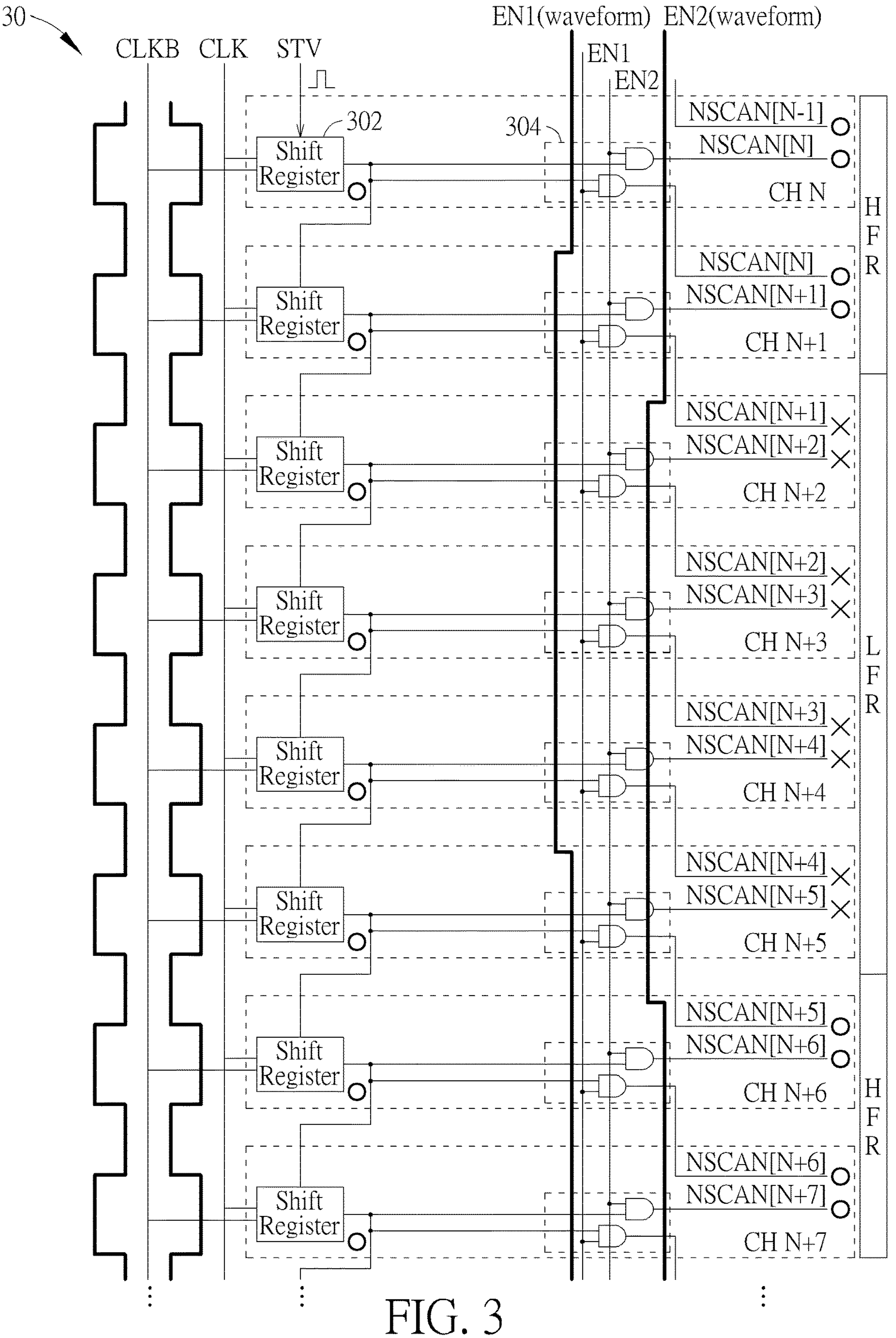
FIG. 3 is a schematic diagram of a GOA circuit and its implementation in the MFD application.

As shown in FIG. 2, the NMOS transistors MN1 and MN2 are controlled by the scan signals NSCAN[N−1] and NSCAN[N], respectively, and these two scan signals are generated by the shift registers in the GOA circuit, where an exemplary structure and implementation of the shift registers are shown in FIG. 3.

FIG. 3 is a schematic diagram of a GOA circuit 30 and its implementation in the MFD application, where several scan channels (e.g., N–(N+7)) of the GOA circuit 30 are shown. The GOA circuit 30 may receive clock signals CLK and CLKB, a start pulse STV, and enable signals EN1 and EN2 from a display driver circuit, where the waveforms of the clock signals CLK and CLKB and the enable signals EN1 and EN2 are also shown in FIG. 3 to facilitate the illustrations. To be corresponding to the scan sequence of the scan channels, the timing of these waveforms will proceed downward. The left side of the waveforms may represent a low level and the right side of the waveforms may represent a high level, but not limited thereto. The GOA circuit 30 may output scan signals NSCAN to multiple scan lines of a display panel to control the corresponding pixels. In this embodiment, the pixels may have a circuit structure as shown in FIG. 2, and thus each scan channel is configured to generate two scan signals (e.g., NSCAN[N−1] and NSCAN[N]) for the pixels located in a row of the display panel.

Under the MFD application, the display panel is divided into one or more HFR areas and one or more LFR areas, where the pixels in the HFR areas are refreshed and the pixels in the LFR areas are not refreshed. Correspondingly, in the GOA circuit 30, several scan channels are allocated to the HFR areas and several scan channels are allocated to the LFR areas. As shown in FIG. 3, the scan channels N, (N+1), (N+6) and (N+7) are allocated to the HFR area, and thus the scan signals NSCAN of these scan channels are normally output; the scan channels (N+2)-(N+5) are allocated to the LFR area, and thus the scan signals NSCAN of these scan channels are gated or disabled.

As shown in FIG. 3, each scan channel includes a shift register 302 and an output enable circuit 304. Each shift register 302 may generate a scan signal NSCAN for the corresponding scan line, and coupled to the shift registers 302 of adjacent scan channels. The start pulse STV is received by the shift register 302 of the first scan channel, which shifts the scan pulse to subsequent shift registers 302 stage by stage, based on the control of the clock signals CLK and CLKB, which may be inverse clock signals. More specifically, the clock signals CLK and CLKB continuously toggle to define the timing of a horizontal line period for each scan channel, and the scan pulse is shifted to the next shift register in each horizontal line period, where a clock cycle of the clock signals CLK and CLKB may correspond to one horizontal line period. In this manner, the shift registers 302 (except for that in the first scan channel) may receive the scan pulse from the previous stage and receive the clock signals CLK and CLKB. Based on the scan pulse (or the start pulse STV) received from the previous stage and the clock signals CLK and CLKB, the shift register 302 may generate the scan pulse to be output to the next stage (i.e., the shift register 302 of the next scan channel).

The output enable circuit 304 is coupled to the shift register 302, and may output the scan signals NSCAN according to the scan pulse received from the corresponding shift register 302 and the enable signals EN1 and EN2. The enable signals EN1 and EN2 may enable or disable the output of the scan signals NSCAN according to whether the scan channel is allocated to the HFR area or the LFR area. More specifically, according to the enable signals EN1 and EN2, those scan signals NSCAN for the HFR area are enabled, and those scan signals NSCAN for the LFR area are gated by the enable signals EN1 and EN2 and thus disabled.

In order to control the enablement of the scan signals NSCAN, the enable signals EN1 and EN2 may be in a first state when the scan operation proceeds to the HFR area, and may be in a second state when the scan operation proceeds to the LFR area. In this embodiment, the first state may be a high level. The enable signals EN1 and EN2 in the high level may enable the scan signal output of the GOA circuit 30, allowing the output enable circuit 304 to normally output the scan signals NSCAN to the pixel circuits in the HFR area. The second state may be a low level. The enable signals EN1 and EN2 in the low level may disable the scan signal output by fixing the scan lines at the low level, so that the scan signals NSCAN will not be output to the pixel circuits in the LFR area.

In this embodiment, the output enable circuit 304 includes two "AND" gates, which receive the enable signals EN1 and EN2, respectively. The "AND" gates may perform logic operation on the scan pulse (which may be received from the corresponding shift register 302) and the enable signal EN1 or EN2, to allow the scan signal NSCAN to be output only when the corresponding enable signal EN1 or EN2 is at the high level.

Referring back to FIG. 2 along with FIG. 3, it is assumed that the pixel circuit 20 shown in FIG. 2 is coupled to the scan channel N shown in FIG. 3; hence, the NMOS transistors MN1 and MN2 are controlled by the previous scan signal NSCAN[N−1] and the present scan signal NSCAN [N], respectively. In general, an operational cycle of an OLED pixel includes initialization, data writing, and emission phases. The initialization phase may be regarded as the previous horizontal line period, where the pixel circuit 20 is initialized by using the previous scan signal NSCAN[N−1]. The data voltage VD is then written into the driving transistor MP1 of the pixel circuit 20 in the data writing phase of the present horizontal line period, where the pixel circuit 20 receives the present scan signal NSCAN[N]. Therefore, the previous scan signal NSCAN[N−1] and the present scan signal NSCAN[N] output to the same pixel circuit 20 should be well controlled (i.e., enabled or gated) by the enable signals EN1 and EN2, in order to provide appropriate enablement control under the frame rate allocation, especially when the scan operation proceeds from the HFR area to the LFR area or from the LFR area to the HFR area.

For example, as shown in FIG. 3, the scan channels N and (N+1) are allocated to the HFR area, and the scan operation enters the LFR area in the scan channel (N+2). Therefore, the scan signals NSCAN[N+2] corresponding to the scan channel (N+2) should be gated in the corresponding horizontal line period. Since the pixels controlled by the scan channel (N+2) are not refreshed, the scan signal NSCAN [N+1] to be output to these pixels in the previous horizontal line period should also be gated. Therefore, the enable signal EN1 should change its state in the previous horizontal line period corresponding to the scan channel (N+1) before the scan operation enters the LFR area, so that the pixels controlled by the scan channel (N+2) will not be wrongly initialized.

More specifically, the enable signal EN2 may transit from the high level to the low level to disable the scan signal output in a horizontal line period where the scan operation proceeds to the scan channel (N+2), so that the scan signal NSCAN[N+2] will not be output to the scan line controlled by the scan channel (N+2). The enable signal EN1 may transit from the high level to the low level to disable the scan signal output in the previous horizontal line period where the scan operation proceeds to the scan channel (N+1) which is adjacent to the scan channel (N+2), so that the scan signal NSCAN[N+1] will not be output to the scan line controlled by the scan channel (N+2), even if the scan signal NSCAN [N+1] may still be output to the corresponding scan line in the previous row (i.e., which is controlled by the scan channel (N+1)). This prevents the display panel from generating an unwanted horizontal bright line due to the initial voltage Vinit1 written into the capacitor C1 in the pixel circuit 20. Note that the pixels are not refreshed when allocated to the LFR areas; hence, the electric charges stored in the capacitors of the pixel circuits in the LFR areas should not be varied, in order to keep the image consistent through non-refreshed frames. Therefore, the pixels in the LFR areas cannot be initialized, so as to keep the capacitor charges unchanged.

Similarly, the scan operation from the LFR area enters the HFR area in the scan channel (N+6), and the enable signal EN1 should change its state (i.e., transition from low to high) in the previous horizontal line period where the scan operation proceeds to the scan channel (N+5), while the enable signal EN2 changes its state (i.e., transition from low to high) when the scan operation proceeds to the scan channel (N+6). In such a situation, the pixels controlled by the scan channel (N+6) can be appropriately initialized, allowing the data voltage VD to be successfully written into the pixel circuit 20 at the beginning of the HFR area.

As shown in FIG. 3, the clock signals CLK and CLKB continuously toggle when the scan operation proceeds to the LFR area, allowing the scan pulse to be shifted continuously. As mentioned above, the toggling of the clock signals CLK and CLKB consumes a great amount of power, such that the power consumption behavior of the display panel in the MFD application may not be satisfactory. In an embodiment of the present invention, the clock signals CLK and CLKB may be stopped when the scan operation proceeds to the LFR area.

Figure 4:
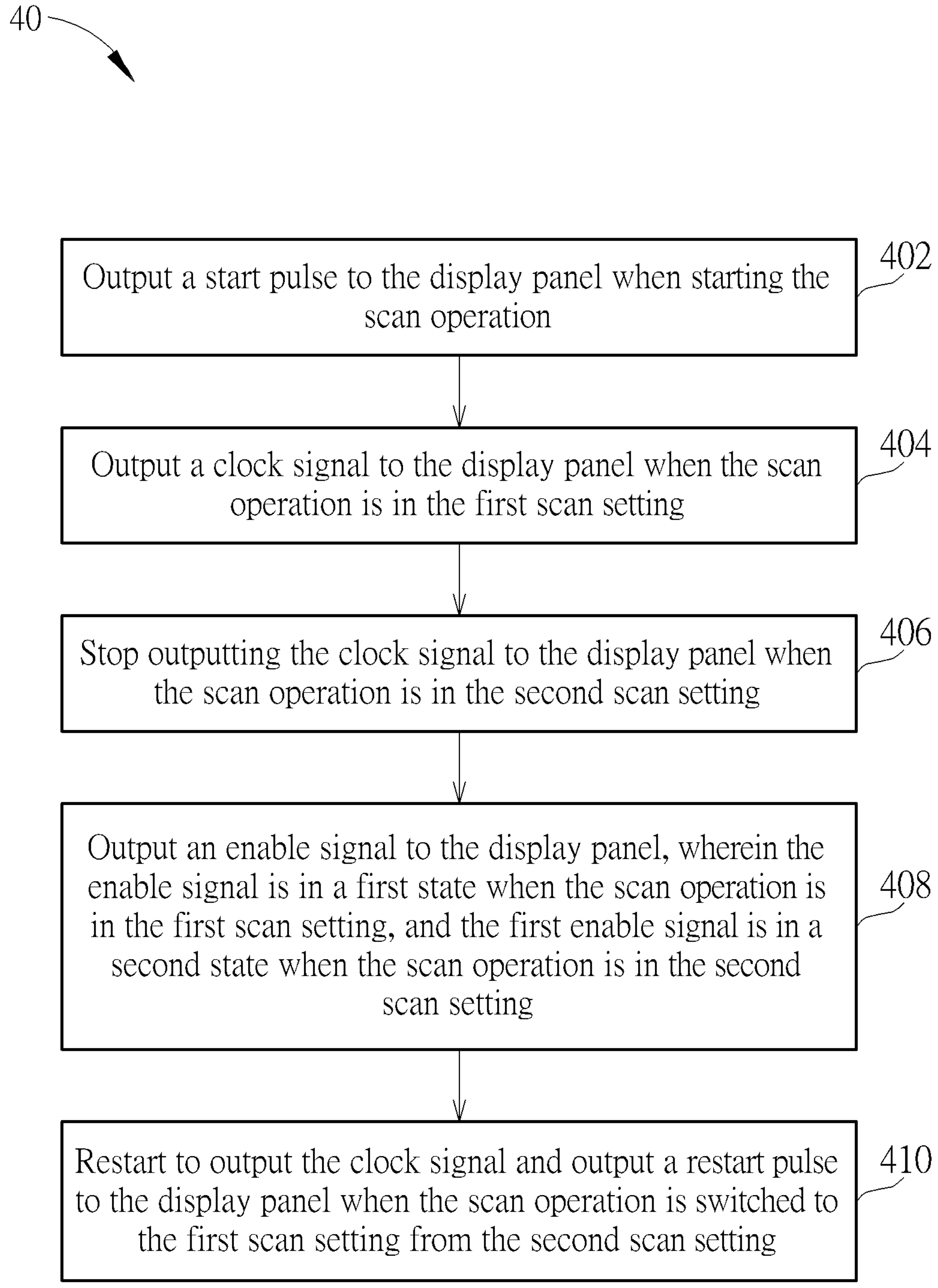
FIG. 4 is a flowchart of a control process according to an embodiment of the present invention.

FIG. 4 is a flowchart of a control process 40 according to an embodiment of the present invention. The control process 40 may be applied to a display driver circuit, for controlling a display panel under the MFD application by outputting control signals to a scan control circuit of the display panel, where the control signals may include, but not limited to, the clock signals CLK and CLKB, the start pulse STV, and the enable signals EN1 and EN2 as described above. Based on the MFD operation, the display panel may perform a scan operation on an image frame with a first scan setting and a second scan setting. As shown in FIG. 4, the control process 40 includes the following steps:

Step 402: Output a start pulse to the display panel when starting the scan operation.

Step 404: Output a clock signal to the display panel when the scan operation is in the first scan setting.

Step 406: Stop outputting the clock signal to the display panel when the scan operation is in the second scan setting.

Step 408: Output an enable signal to the display panel, wherein the enable signal is in a first state when the scan operation is in the first scan setting, and the enable signal is in a second state when the scan operation is in the second scan setting.

Step 410: Restart to output the clock signal and output a restart pulse to the display panel when the scan operation is switched to the first scan setting from the second scan setting.

According to the control process 40, the display panel may be operated in the first scan setting or the second scan setting in the scan operation driven by the display driver circuit, where the first scan setting and the second scan setting may be display settings, which are used for display of the display panel. In an embodiment, the first scan setting may be applied to the pixels in the HFR area, and the second scan setting may be applied to the pixels in the LFR area. In an embodiment, a scan operation indicates scanning an image frame for display; hence, a start pulse may be output to the scan control circuit when the scan operation starts. If the scan operation is performed on the HFR area corresponding to the first scan setting, the display driver circuit may continuously output a clock signal to the scan control circuit, where the clock signal may refer to any or both of the clock signals CLK and CLKB as described above. If the scan operation is performed on the LFR area corresponding to the second scan setting, the display driver circuit may stop outputting the clock signal. Since the clock signal stops toggling and the scan pulse stops shifting in the LFR area, when the scan operation is switched from the LFR area to the HFR area, the display driver circuit should restart to output the clock signal to the scan control circuit, and output a restart pulse to generate the scan pulse to be shifted in the subsequent scan channels. In addition, the display driver circuit may output an enable signal to the scan control circuit. The enable signal, which may refer to any or both of the enable signals EN1 and EN2 as described above, may enable or disable the scan signal output based on whether the corresponding scan line and pixels are allocated to the HFR area or the LFR area. In an embodiment, the scan control circuit may be a GOA circuit.

Figure 5:
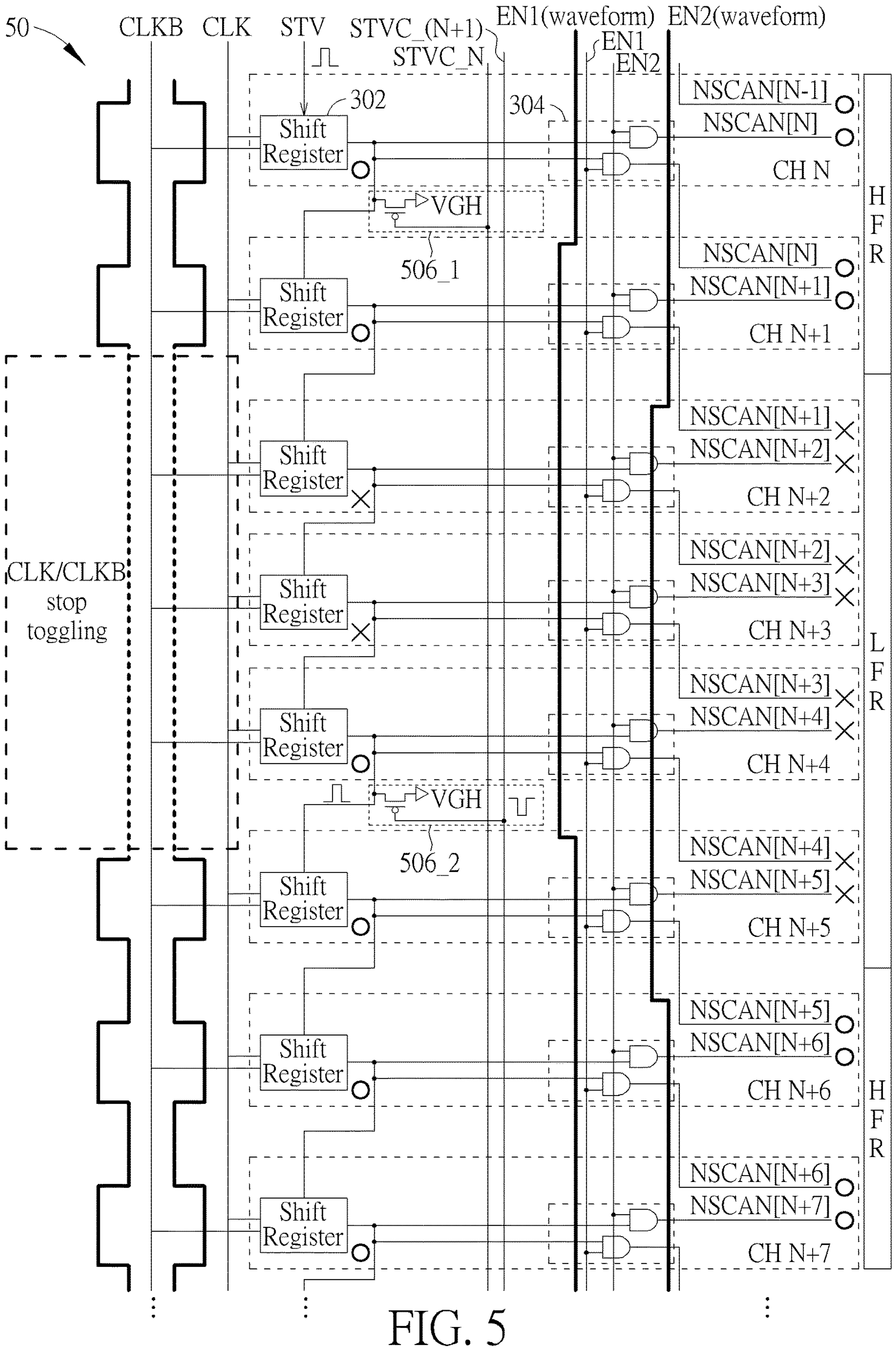
FIG. 5 is a schematic diagram of a GOA circuit and its implementation in the MFD application.

FIG. 5 is a schematic diagram of a GOA circuit 50 and its implementation in the MFD application, where several scan channels (e. g., N–(N+7)) of the GOA circuit 50 are shown. The structure of the GOA circuit 50 is similar to the structure of the GOA circuit 30, so signals and elements having similar functions are denoted by the same symbols. Similarly, the GOA circuit 50 may receive the clock signals CLK and CLKB, the start pulse STV, and the enable signals EN1 and EN2 from the display driver circuit, and output the scan signals NSCAN to the scan lines and pixels on the display panel. The waveforms of the clock signals CLK and CLKB and the enable signals EN1 and EN2 are also shown in FIG. 5 to facilitate the illustrations. In the embodiment shown in FIG. 5, the clock signals CLK and CLKB do not toggle when the scan operation proceeds to the LFR area, as different from the case shown in FIG. 3.

Since the clock signals CLK and CLKB are stopped in the LFR area, the shift registers 302 cannot shift the scan pulse normally. In such a situation, the output of the shift registers 302 in the scan channels allocated to the LFR area may be disabled. In an embodiment, the output of these shift registers 302 may become high impedance when the clock signals CLK and CLKB are stopped. Since the scan signals NSCAN are gated by the enable signals EN1 and EN2, the high impedance output of the shift registers 302 will not affect the scan operation.

When the scan operation reaches the HFR area, a restart pulse should be generated in the corresponding scan channel, in order to restart the shifting of the scan pulse and the output of the scan signals NSCAN. The GOA circuit 50 may further include at least one pulse generator to serve this purpose, where two pulse generators 506_1 and 506_2 are shown in FIG. 5. Each of the pulse generators 506_1 and 506_2 may be coupled between the output terminal of the shift register 302 in a first scan channel and the input terminal of the shift register 302 in a second scan channel, where the first scan channel and the second scan channel are two adjacent scan channels. More specifically, the pulse generator 506_1 is coupled between the shift registers 302 of the scan channels N and (N+1), and the pulse generator 506_2 is coupled between the shift registers 302 of the scan channels (N+4) and (N+5).

In this embodiment, each of the pulse generators 506 1 and 506_2 includes a switch, which may be coupled between two adjacent shift registers 302, and also coupled to a voltage supply terminal and the display driver circuit. More specifically, as shown in FIG. 5, a first terminal of the switch is coupled to the shift registers 302, a second terminal of the switch is coupled to the voltage supply terminal to receive a gate high voltage VGH, and the control terminal of the switch is coupled to an output terminal of the display driver circuit to receive the restart pulse from the display driver circuit. In detail, the switch of the pulse generator 506_1 may receive the restart pulse STVC_N and the switch of the pulse generator 506_2 may receive the restart pulse STVC_(N+1). The display driver circuit may output the restart pulses STVC_N and STVC_(N+1) to the corresponding pulse generators 506_1 and 506_2, respectively. Therefore, the pulse generator 506_1 or 506_2 will generate a scan pulse accordingly, to restart the shifting of the scan pulse when the clock signals CLK and CLKB restart to toggle at the beginning of the HFR area. In such a situation, the shift registers in the subsequent scan channels will forward the scan pulse after the scan operation is switched to the HFR area from the LFR area.

Note that the restart pulses are not output under normal display. For example, if the entire frame is allocated to the HFR area, or if the switch of a pulse generator is in the HFR area, the corresponding restart pulse may not need to be output. This is because the scan pulse can shift normally in the HFR area where the clock signals CLK and CLKB toggle normally. Only when the scan operation proceeds to the LFR area and is predicted to enter the HFR area in a subsequent scan channel, a corresponding restart pulse will be output to restart the shifting of the scan pulse.

In FIG. 5, the clock signals CLK and CLKB, the start pulse STV, the enable signals EN1 and EN2, and the restart pulses STVC_N, STVC_(N+1) . . . are control signals output by the display driver circuit. Therefore, at the beginning of the LFR area, the display driver circuit may stop outputting the clock signals CLK and CLKB and change the states of the enable signals EN1 and EN2 to disable the output of the scan signals NSCAN. When the scan operation proceeds to the HFR area from the LFR area, the display driver circuit may restart to output the clock signals CLK and CLKB and change the states of the enable signals EN1 and EN2 to enable the output of the scan signals NSCAN. Meanwhile, the display driver circuit may output a restart pulse to a pulse generator to restart the shifting of the scan pulse. Based on the display data received from the front-end video source and/or related display settings, the display driver circuit may determine the allocations of the HFR area and the LFR area in each image frame, and correspondingly output these control signals to the GOA circuit.

In this embodiment, the HFR area starts at the scan channel (N+6); hence, the clock signals CLK and CLKB start to toggle at the previous scan channel (N+5). A low pulse may be output as the restart pulse STVC_(N+1), which conducts the switch in the corresponding pulse generator 506_2 in a short period to generate a high-active scan pulse which is forwarded to the shift register 302 of the scan channel (N+5) and then shifted to subsequent shift registers 302 stage by stage in each clock cycle. At this time, the enable signals EN1 and EN2 change their states to enable the output of the scan signals NSCAN. More specifically, the enable signal EN2 enables the output of the scan signal NSCAN[N+6] at the scan channel (N+6) where the HFR area starts, and the enable signal EN1 enables the output of the scan signal NSCAN[N+5] at the previous scan channel (N+5), to initialize the pixels controlled by the scan channel (N+6). Therefore, the scan pulse will restart to shift and the display panel may be refreshed normally in the subsequent HFR area.

In another embodiment, it is feasible to restart the clock signals of the GOA circuit earlier. For example, even if the HFR area starts at the scan channel (N+6), the clock signals CLK and CLKB may start to toggle at an earlier scan channel such as (N+3) or (N+4). In a similar manner, it is feasible to stop the clock signals of the GOA circuit later after the scan operation proceeds to the LFR area. For example, even if the LFR area starts at the scan channel (N+2), the clock signals CLK and CLKB may be stopped at a later scan channel such as (N+3) or (N+4).

Figure 6:
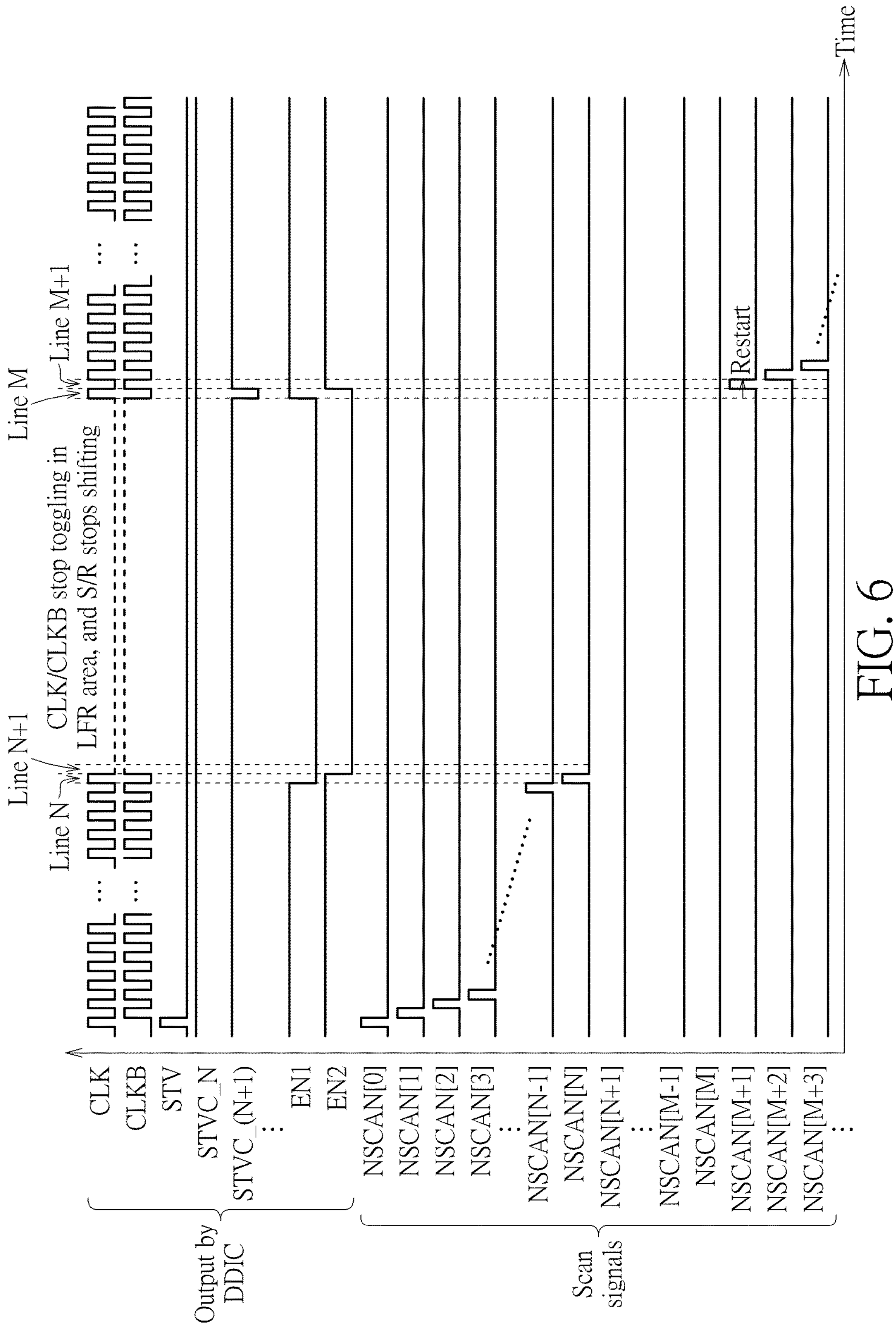
FIG. 6 is a waveform diagram of the GOA circuit shown in FIG. 5.

FIG. 6 is a waveform diagram of the GOA circuit 50, which illustrates that the scan operation proceeds from the HFR area to the LFR area at the horizontal line (N+1) and then returns to the HFR area at the horizontal line (M+1). Each horizontal line may represent a row of pixels on the display panel. In detail, FIG. 6 illustrates the waveforms of the clock signals CLK and CLKB, the start pulse STV, the restart pulses STVC_N and STVC_(N+1), and the enable signals EN1 and EN2. These control signals may be output by a display driver circuit such as a display driver integrated circuit (DDIC). FIG. 6 also illustrates the scan signals NSCAN[0], NSCAN[1] . . . that may be output to the pixels by the GOA circuit in an image frame.

In this image frame, the scan operation starts in the HFR area, and the start pulse STV is output at the start of the scan operation and then the corresponding scan pulse shifts normally to generate the scan signals NSCAN. At the end of the HFR area at the horizontal line N, the enable signals EN1 and EN2 are switched low sequentially to disable the output of the scan signals NSCAN, and the signal transitions of the enable signals EN1 and EN2 may follow the manner described in the above paragraphs. In addition, the shift register stops shifting the scan pulse when the scan operation proceeds to the LFR area since the clock signals CLK and CLKB are stopped.

Subsequently, at the end of the LFR area at the horizontal line M, the enable signals EN1 and EN2 are switched high sequentially to enable the output of the scan signals NSCAN. In addition, the clock signals CLK and CLKB restart to toggle, and the restart pulse STVC_(N+1), which may be a low pulse, is applied to restart the shifting of the scan pulse at the horizontal line (M+1) where the HFR area starts.

Figure 7:
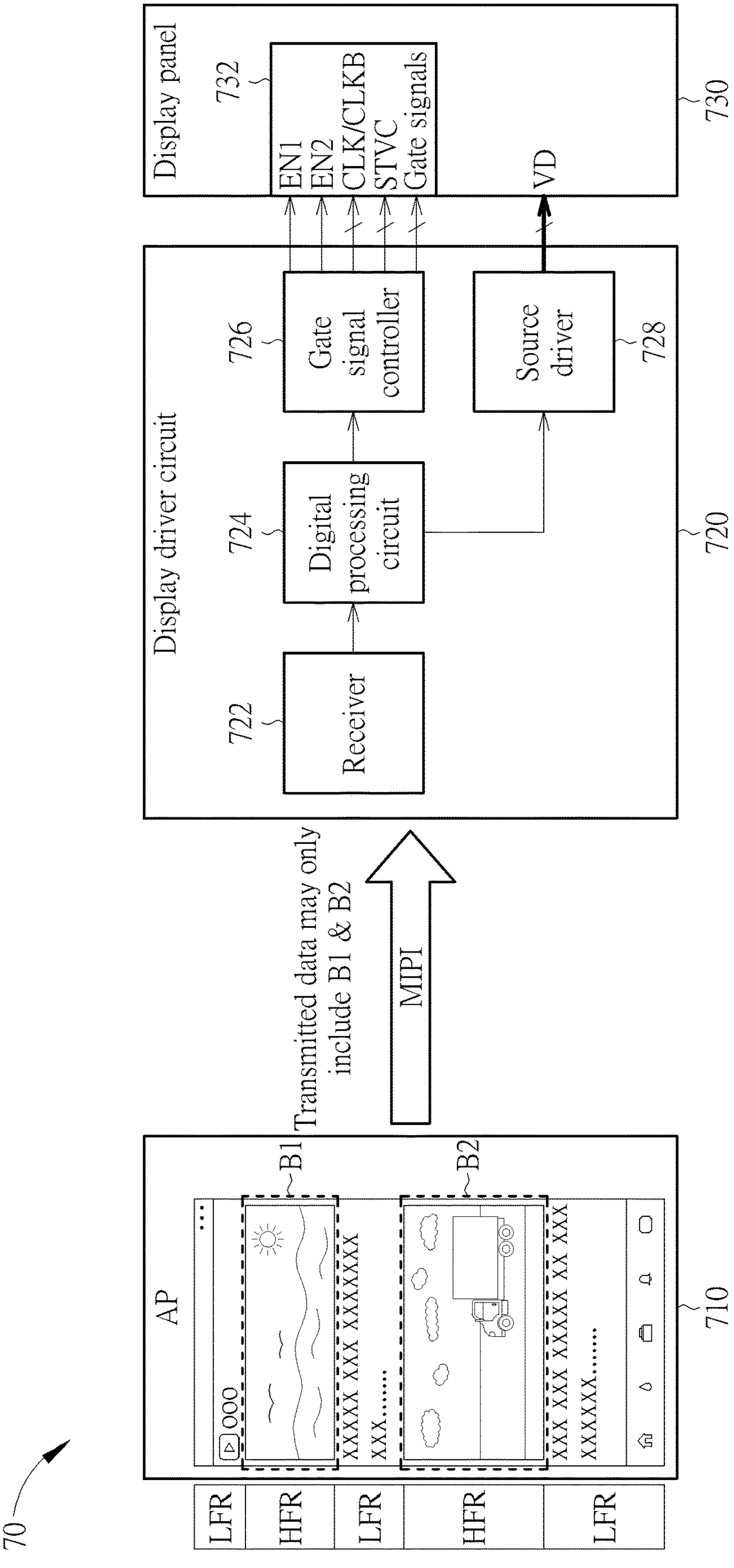
FIG. 7 is a schematic diagram of a display system according to an embodiment of the present invention.

FIG. 7 is a schematic diagram of a display system 70 according to an embodiment of the present invention. The display system 70 includes an application processor (AP) 710, a display driver circuit 720 and a display panel 730. The AP 710, which may serve as a video source or video provider, may output display data to the display driver circuit 720. The display driver circuit 720 may process the display data and convert the display data into data voltages VD to be output to the pixels on the display panel 730. In detail, the display driver circuit 720 may output the data voltages VD to the data lines on the display panel 730. Correspondingly, the display driver circuit 720 may output control signals to the display panel 730 for gate control and/or emission control. In an embodiment, the display driver circuit 720 may be implemented in an integrated circuit (IC) to realize a DDIC. The display panel 730 may be any type of display device, which may be, but not limited to, an LTPO OLED panel, low-temperature polycrystalline silicon (LTPS) OLED panel, LTPS liquid crystal display (LCD) panel, amorphous silicon (a-Si) LCD panel, IGZO LCD panel, or any other panel receiving scan line control.

In detail, the display system 70 may apply the MFD operation, where an image frame includes several parts allocated to the HFR area and other parts allocated to the LFR area based on the frame rate settings. Therefore, those pixels in the HFR area may be refreshed and those pixels in the LFR area may not be refreshed in the image frame. For example, as shown in FIG. 7, the video areas in blocks B1 and B2 require the HFR, and other text areas may use the LFR. Therefore, several scan channels for outputting dynamic video data may be allocated to an HFR area, and several scan channels for outputting static image data may be allocated to an LFR area.

As shown in FIG. 7, the display driver circuit 720 includes a receiver 722, a digital processing circuit 724, a gate signal controller (also called scan signal controller) 726 and a source driver 728. The receiver 722 may receive display data from the AP 710 through an interface such as the Mobile Industry Processor Interface (MIPI). In an embodiment, the AP 710 may transmit display data of an entire frame to the display driver circuit 720, and the display driver circuit 720 determines which areas need to be refreshed and which areas need not to be refreshed according to the received display data and related frame rate information. In an embodiment, in order to further reduce transmission resources and power consumption, the AP 710 may transmit only the display data in specific areas needing to be refreshed (e.g., the blocks B1 and B2) in an image frame, and provide related information for the display driver circuit 720 to indicate that only these areas/blocks need to be refreshed in this image frame.

Based on the display data received from the AP 710, the digital processing circuit 724 may obtain the addresses of the display data, and determine the start position and end position of each block B1 and B2 to determine which area(s) should be refreshed. Therefore, the digital processing circuit 724 may allocate the corresponding scan channels to be in the HFR area, and instruct the gate signal controller 726 to output the enable signals EN1 and EN2 correspondingly. Also, the gate signal controller 726 may stop the clock signals CLK and CLKB in the LFR area, and restart the clock signals CLK and CLKB and output a corresponding restart pulse STVC when entering the HFR area. In this embodiment, the gate signal controller 726 is responsible for outputting the enable signals EN1 and EN2, the clock signals CLK and CLKB, and the restart pulse STVC to the GOA circuit 732 of the display panel 730. In addition, the gate signal controller 726 may also output other gate control signals (including other scan signals and/or emission control signals for the pixels) to the GOA circuit 732 (or another GOA circuit) of the display panel 730.

Correspondingly, the source driver 728 may output the data voltages VD to the display panel 730, where the data voltages VD are converted from the display data received from the AP 710. In an embodiment, only the pixels allocated to the HFR area need to be refreshed; hence, the source driver 728 may only output the data voltages VD to the pixels in the HFR area.

Note that the GOA circuit in the above embodiment is used to output the scan signals NSCAN for controlling the NMOS transistors in the pixel circuit of an LTPO panel (such as the NMOS transistors MN1 and MN2 shown in FIG. 2). In another embodiment, the implementations of stopping the GOA clocks in the LFR area and restarting the GOA clocks in the HFR area may be applied to an LTPS OLED panel, where all transistors in the pixel circuit are PMOS transistors.

Figure 8:
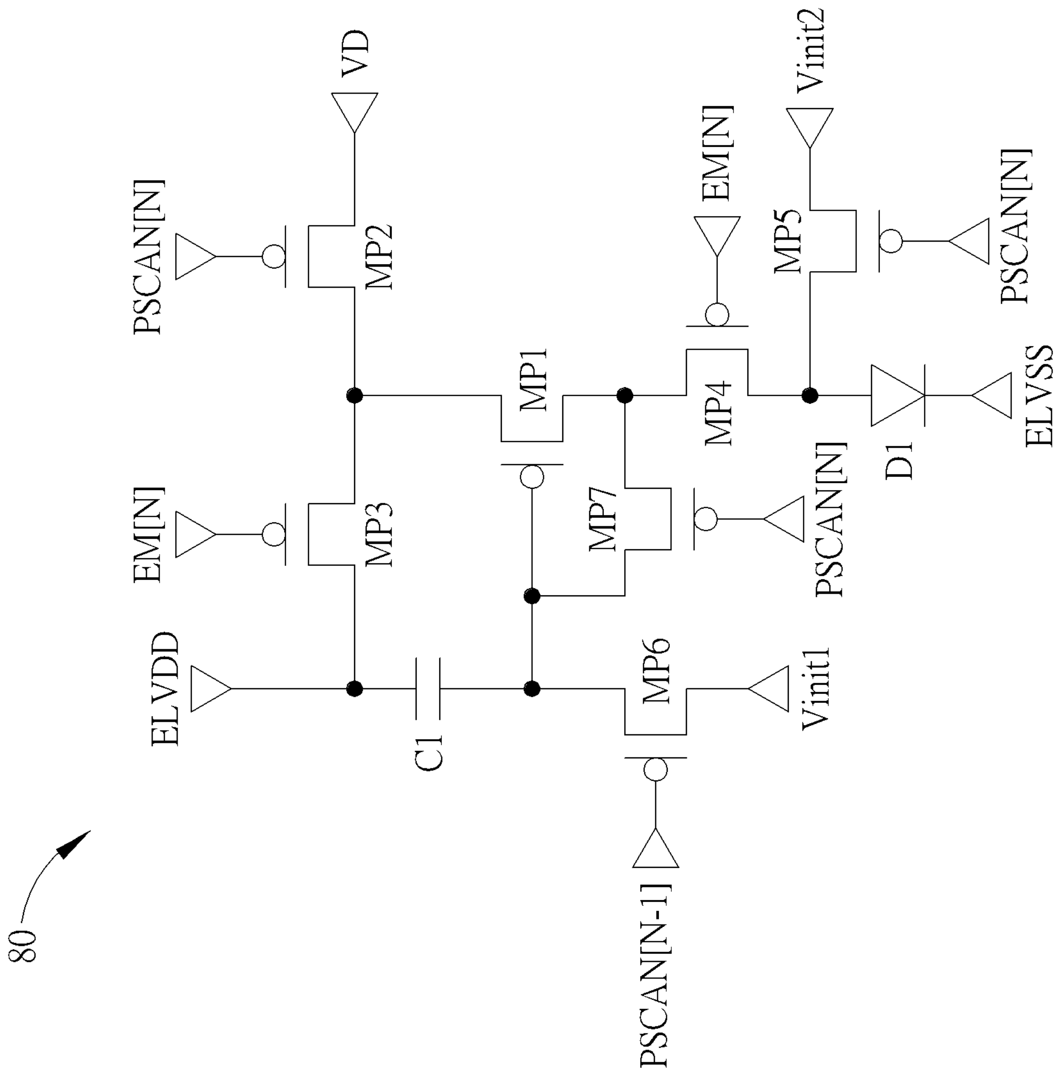
FIG. 8 is a schematic diagram of an exemplary pixel circuit of an LTPS panel.

FIG. 8 is a schematic diagram of an exemplary pixel circuit 80 of an LTPS panel. The structure of the pixel circuit 80 is similar to the structure of the pixel circuit 20 shown in FIG. 2, so signals and elements having similar functions are denoted by the same symbols. The difference between the pixel circuit 80 and the pixel circuit 20 is that the NMOS transistors MN1 and MN2 of the pixel circuit 20 are replaced by the PMOS transistors MP6 and MP7 in the pixel circuit 80. Other components of the pixel circuit 80 are identical to those of the pixel circuit 20, and their related implementations and operations are illustrated in the above paragraphs and will not be repeated herein.

Note that in the pixel circuit 80, the PMOS transistors MP6 and MP7 are controlled by the scan signals PSCAN[N−1] and PSCAN[N], respectively. Since a PMOS transistor is turned on by a low-level signal and turned off by a high-level signal, the scan signals PSCAN[N−1] and PSCAN[N] may be low-active signals, which are normally high and include low pulses in the corresponding horizontal line periods to turn on the target transistors. On the other hand, as for the pixel circuit 20 of the LTPO panel as shown in FIG. 2, the scan signals NSCAN[N−1] and NSCAN[N] used for controlling the NMOS transistors are high-active signals, which are normally low and include high pulses in the corresponding horizontal line periods to turn on the target transistors. In such a situation, the scan signals PSCAN and the scan signals NSCAN may be generated in slightly different manners.

Figure 9:
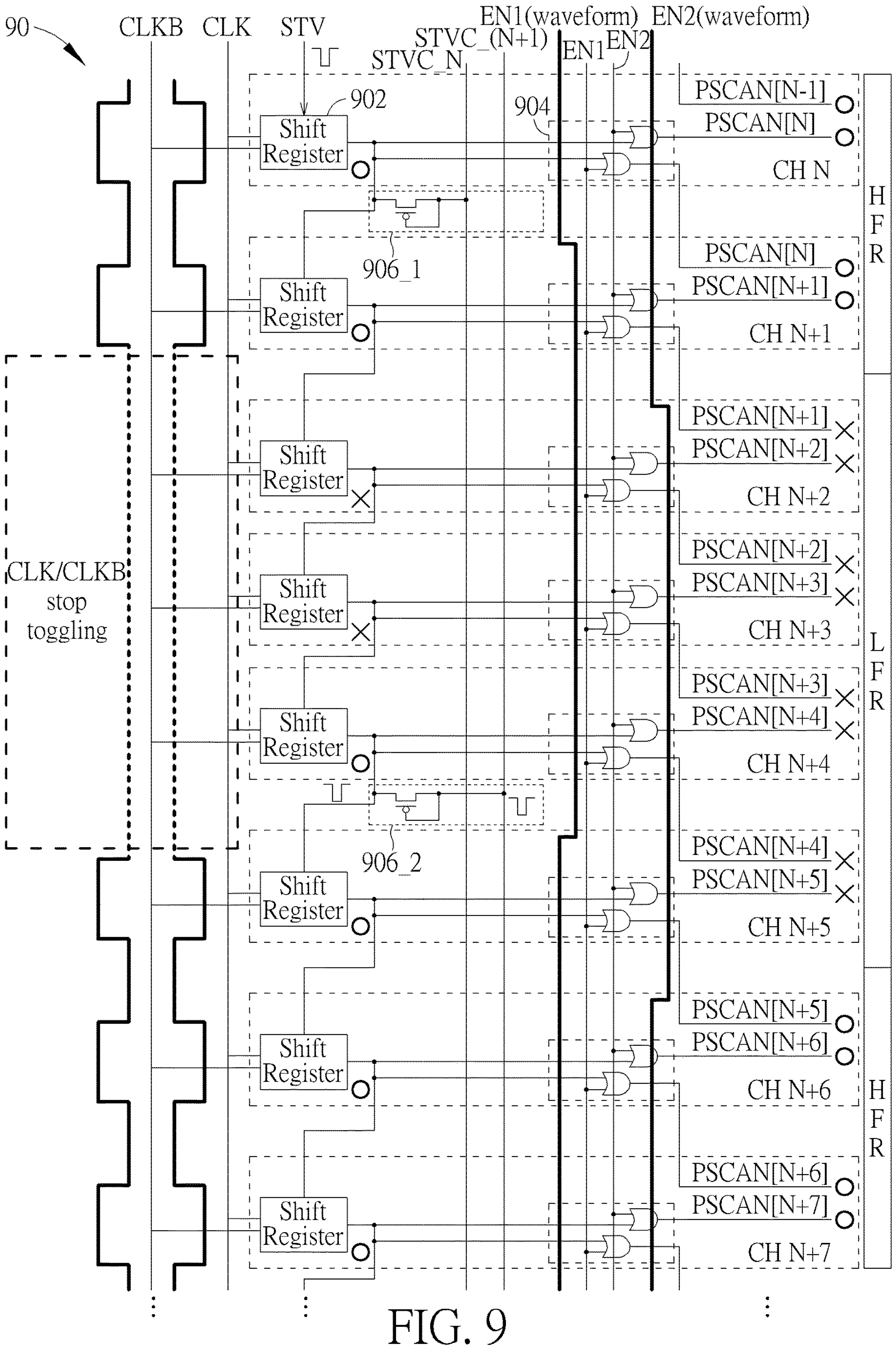
FIG. 9 is a schematic diagram of a GOA circuit and its implementation in the MFD application.

FIG. 9 is a schematic diagram of a GOA circuit 90 and its implementation in the MFD application, where several scan channels (e.g., N–(N+7)) of the GOA circuit 90 are shown. The structure of the GOA circuit 90 is similar to the structure of the GOA circuit 50, so signals and elements having similar functions are denoted by the same symbols. Similarly, the GOA circuit 90 may receive the clock signals CLK and CLKB, the start pulse STV, and the enable signals EN1 and EN2 from the display driver circuit. In order to control the PMOS transistors in the pixels, the GOA circuit 90 may output the scan signals PSCAN to the scan lines and pixels on the display panel.

As mentioned above, the scan signals PSCAN are low-active signals having low pulses; hence, the start pulse STV applied to the GOA circuit 90 may be a low pulse. In addition, the shift registers 902 are applied in the GOA circuit 90 to replace the shift registers 302, to shift the low pulse as the scan pulse.

In addition, the pulse generators 906_1 and 906_2 are applied in the GOA circuit 90 to replace the pulse generators 506_1 and 506_2, to generate a low pulse as the scan pulse according to the restart pulse STVC_N or STVC_(N+1) received from the display driver circuit when the scan operation is switched to the HFR area from the LFR area. In detail, each of the pulse generators 906_1 and 906_2 may include a switch. As shown in FIG. 9, a first terminal of the switch is coupled to the shift registers 902 of the corresponding scan channel, a second terminal and the control terminal of the switch are commonly coupled to an output terminal of the display driver circuit. In other words, the switch may have a diode-connected structure, of which a terminal is coupled to the shift registers 902 and another terminal is coupled to the display driver circuit for receiving the restart pulse (e.g., STVC_N, STVC_(N+1) . . . ). The diode-connected switch of the pulse generator 906_1 or

906_2 may forward the low pulse of the restart pulse to the subsequent shift registers 902, to restart to shift the low scan pulse when the scan operation enters the HFR area, so as to generate the low-active scan signals PSCAN.

Further, in the GOA circuit 90 for outputting the low-active scan signals PSCAN, the enable signals EN1 and EN2 may enable and disable the output of the scan signals PSCAN in another manner. As shown in FIG. 9, the output enable circuit 904 is applied in the GOA circuit 90 to replace the output enable circuit 304, to control the enablement of the scan signals PSCAN by using “OR” gates. In this embodiment, the output enable circuit 904 includes two “OR” gates, which receive the enable signals EN1 and EN2, respectively. Based on the logic operations of the “OR” gates, the enable signals EN1 and EN2 in the low level will enable the scan signal output, and in the high level will disable the scan signal output (i.e., which is gated high).

Figure 10:
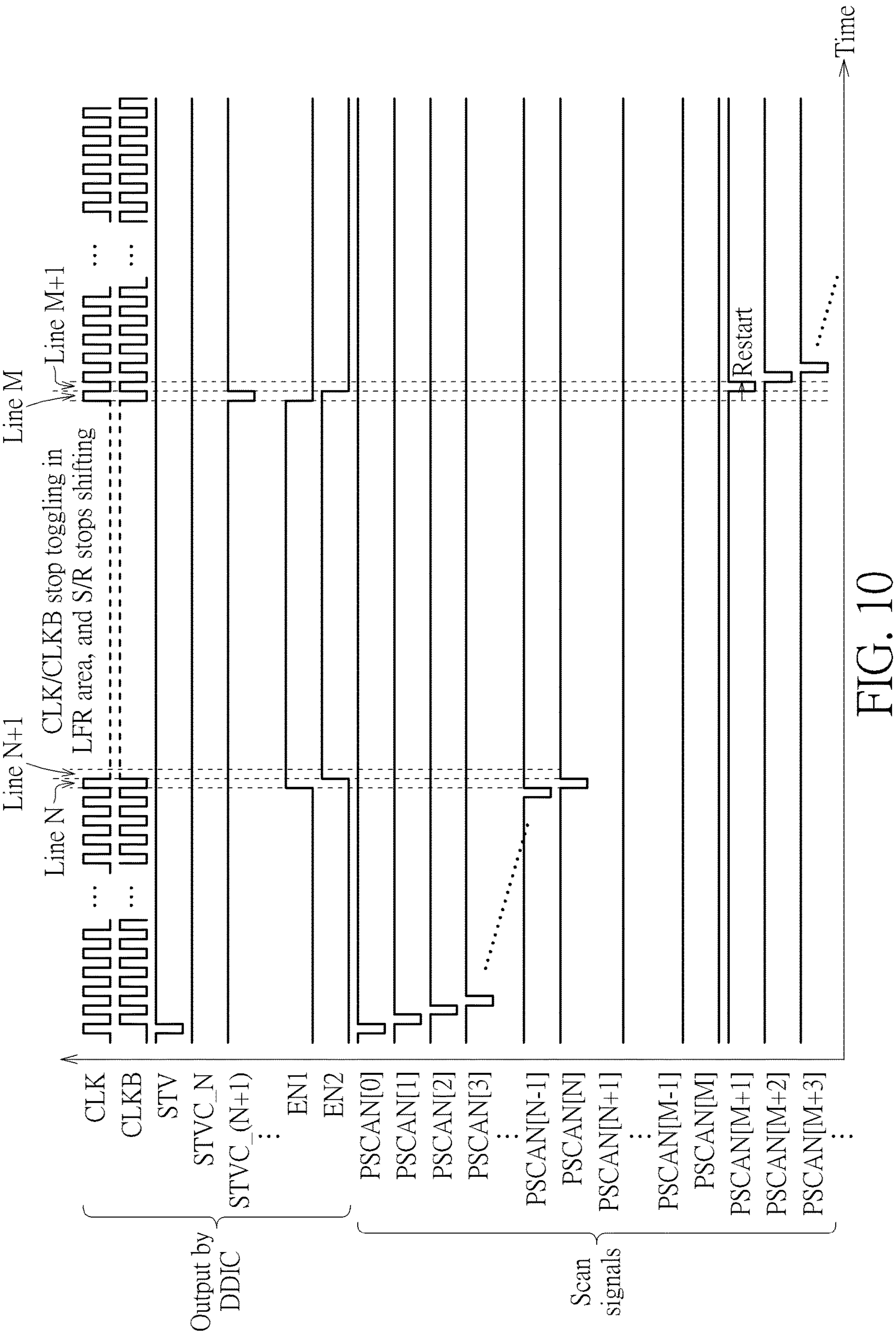
FIG. 10 is a waveform diagram of the GOA circuit shown in FIG. 9.

The detailed waveforms of the control signals of the GOA circuit 90 are illustrated in FIG. 10, where the clock signals CLK and CLKB, the start pulse STV, the restart pulses STVC_N and STVC_(N+1), and the enable signals EN1 and EN2 output by the display driver circuit (e.g., DDIC) and the scan signals PSCAN output to the display panel are shown. As shown in FIG. 10, the start pulse STV and the restart pulse STVC_(N+1) are low pulses for generating the low-active scan signals PSCAN. The levels of the enable signals EN1 and EN2 are also different from those for controlling the high-active scan signals NSCAN as shown in FIG. 6. More specifically, in the HFR area, the enable signals EN1 and EN2 may be in the low level to enable the output of the scan signals PSCAN, and in the LFR area, the enable signals EN1 and EN2 may be in the high level to disable the output of the scan signals PSCAN. Other operations of the GOA circuit 90 are similar to those described in the above paragraphs, and will not be detailed herein.

The GOA circuit 90 shown in FIG. 9 is applicable to the LTPS panel having the structure of the pixel circuit 80 as shown in FIG. 8. It may also be applicable to output the scan signals PSCAN to a pixel circuit of the LTPO panel. Referring back to FIG. 2, the pixel circuit 20 of the LTPO panel may also have several switches implemented with PMOS transistors and receiving the low-active scan signal PSCAN[N] (e.g., MP2 and MP5), and this scan signal PSCAN[N] may be provided from the GOA circuit 90. In fact, the GOA circuit of the present invention is applicable to any type of display panel, to generate scan signals for any pixel structure, which is not limited to those provided in this disclosure. In addition, the generated scan signals may be output to the switch(s) for data reception, the switch(s) for initial voltage reception, and/or the switch(s) for pixel compensation control, but not limited thereto.

Also note that the implementation of the shift registers should not be a limitation of the scope of the present invention. For example, in an embodiment, the stopped clock signals may control the shift register to stop shifting the scan pulse. Alternatively, when the clock signals of the GOA circuit are stopped, the shift register may receive a clear signal (e.g., from the display driver circuit) to stop the shifting of the scan pulse.

Figure 11:
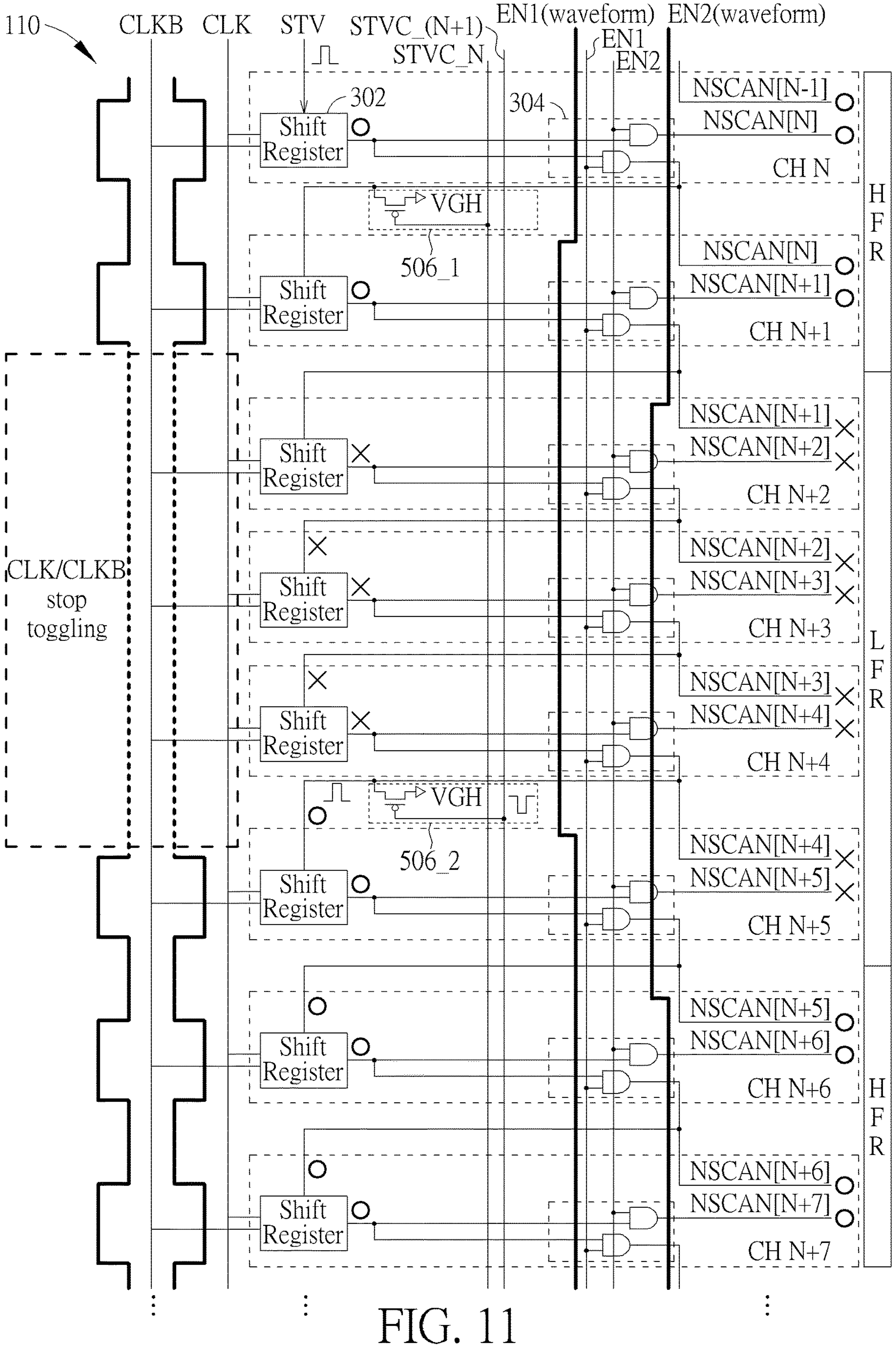
FIG. 11 is a schematic diagram of another GOA circuit according to an embodiment of the present invention.

FIG. 11 is a schematic diagram of another GOA circuit 110 according to an embodiment of the present invention. The structure of the GOA circuit 110 is similar to the structure of the GOA circuit 50, so signals and elements having similar functions are denoted by the same symbols. Different from the GOA circuit 50 or 90 in which the input terminal of each shift register is coupled to the output terminal of the previous shift register, in the GOA circuit 110, the input terminal of each shift register 302 (except for the shift register 302 in the first scan channel) is coupled to an output terminal of the previous scan channel.

For example, in the GOA circuit 50, the input terminal of the shift register 302 of the scan channel (N+1) is coupled to the output terminal of the shift register 302 of the previous scan channel N that outputs the scan pulse to the output enable circuit 304. In comparison, in the GOA circuit 110, the input terminal of the shift register 302 of the scan channel (N+1) is coupled to the output terminal of the output enable circuit 304 of the previous scan channel N that outputs the scan signal NSCAN[N] to the display panel. With this structure, the scan pulse may still be shifted by the shift registers 302 normally in the HFR area. Similarly, the scan signal output may be disabled by using the enable signals EN1 and EN2 in the LFR area. A restart pulse (e.g., STVC_N, STVC_(N+1) . . . ) may be applied to restart the shifting of the scan pulse when the scan operation is switched to the HFR area from the LFR area. The detailed operations are similar to those described above, and will not be repeated herein.

In the GOA circuit 110, the input terminal of each shift register 302 is connected to the output terminal of the previous scan channel. Since the scan signal output is gated by the enable signal EN1 or EN2 in the LFR area, it is ensured that the scan pulse does not appear at the input of subsequent shift registers 302 in the LFR area. Even if the clock signals CLK and CLKB restart to toggle when the scan operation proceeds to the next HFR area, there would be no scan pulse wrongly generated and shifted in the LFR area.

The structure of coupling the input terminal of each shift register to the output terminal of the previous scan channel is also applicable to the GOA circuit that outputs the low-active scan signals PSCAN for controlling PMOS transistors. The detailed operations of this implementation are omitted herein for brevity.

Figure 12:
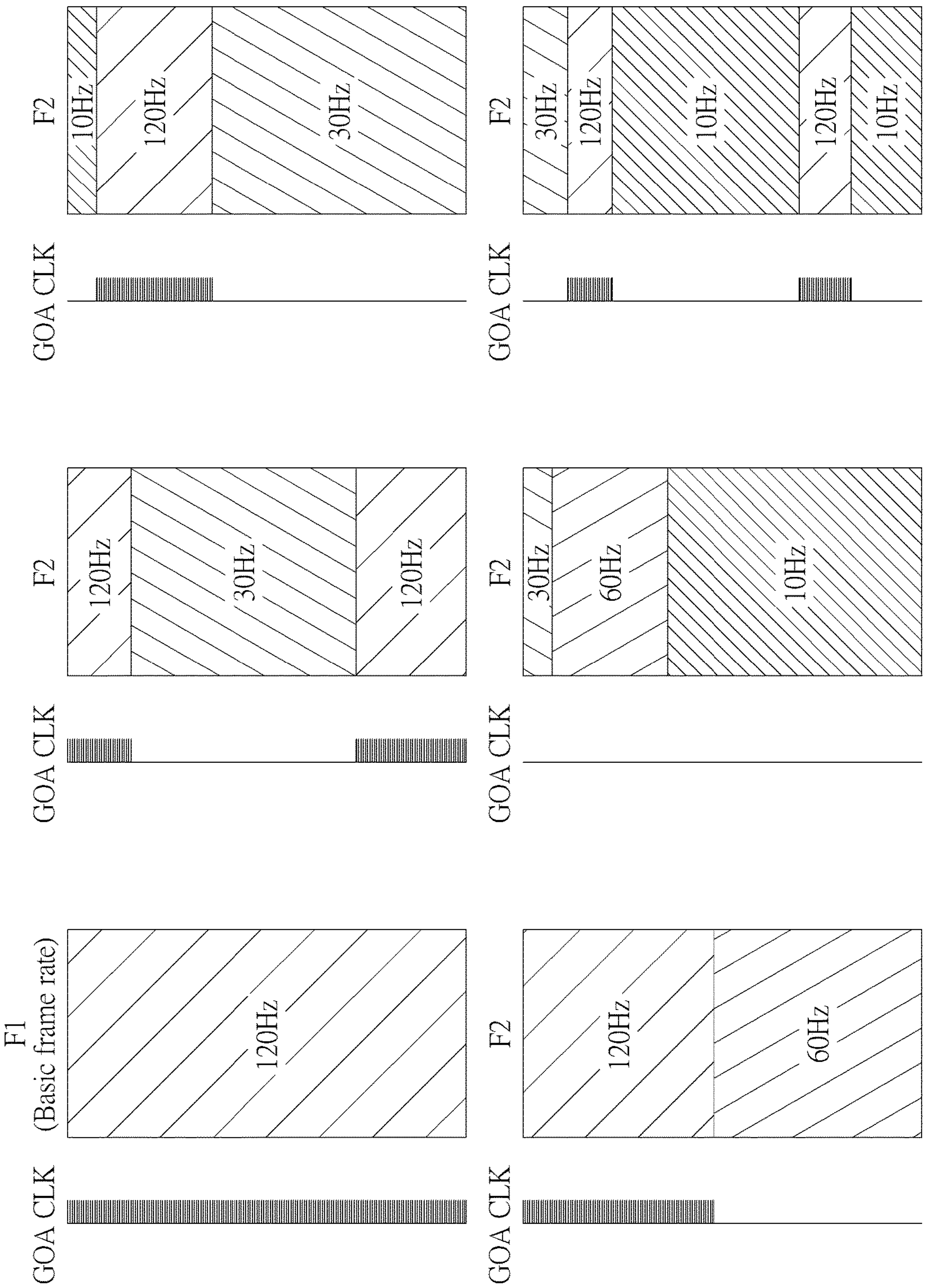
FIG. 12 illustrates that the GOA clock is stopped flexibly based on the frame rate allocations.

Based on the image content and related frame rate settings, the pixel data may be refreshed in an appropriate manner in each image frame. For example, as shown in FIG. 12, the basic frame rate is 120 Hz. In an image frame F1, all pixels in the display panel are refreshed, which means that the entire panel is allocated to the HFR area. In various embodiments shown in FIG. 12, several areas have a low frame rate such as 60, 30 or 10 Hz, and thus these areas in the next image frame F2 are allocated to the LFR area in which the pixels are not refreshed. In the LFR area, the scan signals are not output to the scan lines, and the GOA clock(s) stop toggling. As shown in FIG. 12, the LFR areas may be allocated flexibly, and thus the GOA clock(s) may be stopped when the scan operation proceeds to the LFR areas. Each of the image frame F2 shown in FIG. 12 refers to an embodiment, which illustrates that the GOA clock(s) may be stopped flexibly based on the frame rate allocations.

Therefore, as for different image frames, the HFR and LFR areas may be allocated in different manners, so that the display driver circuit may output (and/or stop outputting) the GOA clock(s) in different manners. For example, in a first image frame, the display driver circuit may stop outputting the clock(s) at a first scan channel; in a second image frame, the display driver circuit may stop outputting the clock(s) at a second scan channel. The second scan channel may be the same as or different from the first scan channel.

Figure 13:
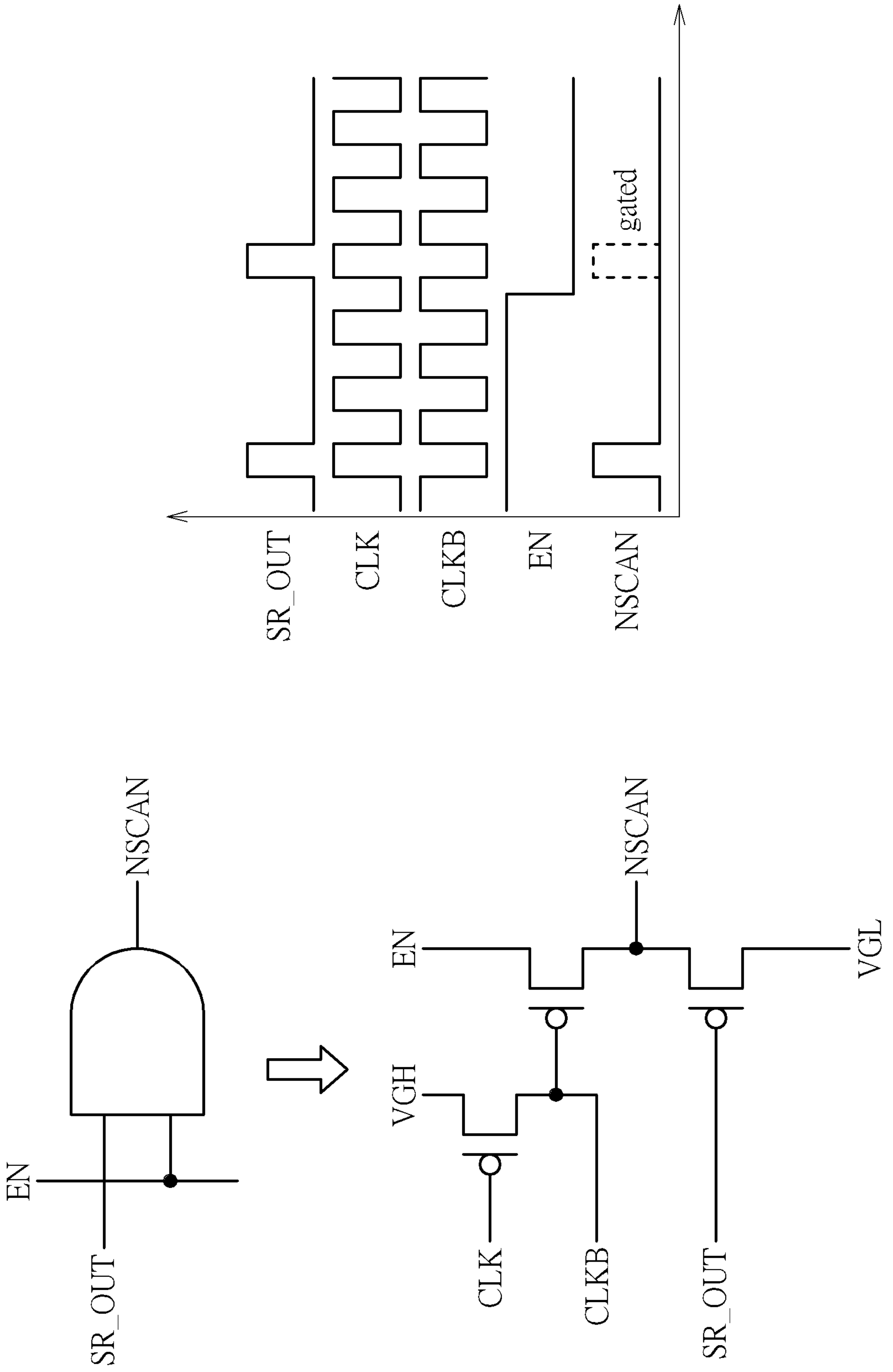
FIG. 13 illustrates an exemplary implementation of an "AND" gate.

In the GOA circuit 50 or 110 in the above embodiment, the enable signals EN1 and EN2 control the enablement of the scan signal output through “AND” gates. FIG. 13 illustrates an exemplary implementation of an “AND” gate, which may receive an output signal SR_OUT from the corresponding shift register and also receive an enable signal EN, the clock signals CLK and CLKB, a gate high voltage VGH, and a gate low voltage VGL. The "AND" gate may perform logic operation on the enable signal EN and the output signal SR_OUT to generate a scan signal NSCAN. The enable signal EN may be any of the enable signals EN1 and EN2 in the above embodiments. The scan signal NSCAN may be any of the scan signals (e.g., NSCAN[N], NSCAN[N+1] . . . ) output by a GOA circuit. The output signal SR_OUT may be any scan pulse generated and output by the shift register in the above embodiments. As shown in FIG. 13, when the enable signal EN is "High", the scan signal NSCAN may be output normally; and when the enable signal EN is "Low", the scan signal NSCAN may be gated and kept low until the enable signal EN changes its state.

In addition, the "OR" gates in the GOA circuit 90 may be implemented in a similar manner, which may be easily inferred by a skilled person and will not be narrated herein.

Note that a display panel usually has hundreds or thousands of rows of pixels, which are controlled by hundreds or thousands of scan channels. In an embodiment, the output terminal of each shift register in the GOA circuit is coupled to a pulse generator, to achieve the maximum flexibility of LFR area allocation, but this implementation requires a large circuit area for deploying a great number of switches used for receiving the restart pulse. In a preferable embodiment, every specific number of scan channels is deployed with a pulse generator; hence, the total number of the pulse generators may be less than the total number of the scan channels.

Figure 14:
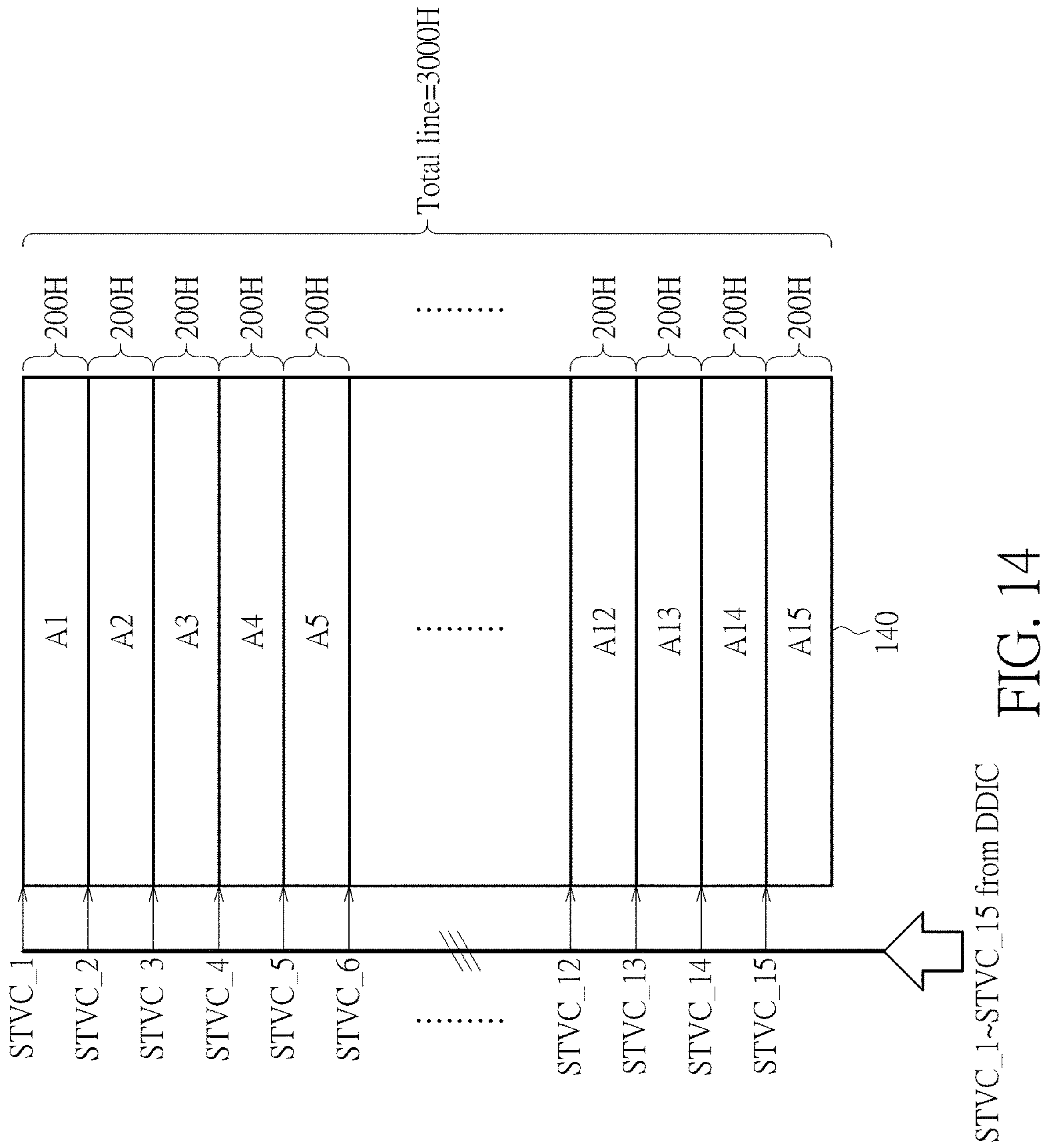
FIG. 14 is a schematic diagram of a display panel applied with a plurality of restart pulses under the MFD operation.

FIG. 14 is a schematic diagram of a display panel 140, where a plurality of restart pulses STVC_1-STVC_15 are applied under the MFD operation. Assume that there are 3000 horizontal lines (e.g., 3000 rows of pixels, denoted by 3000H) in the display panel 140, and that the resolution of frame rate allocation is 200 horizontal lines (denoted by 200H) as a unit. Therefore, one pulse generator may be deployed in every 200 horizontal lines, and thus there are totally 15 pulse generators included in the display panel 140. More specifically, the 3000 horizontal lines of the display panel 140 may be equally (or may be unequally) divided into 15 areas A1-A15, and a pulse generator may be deployed in the first scan channel of each area A1-A15.

In such a situation, the display driver circuit (e.g., DDIC) may output 15 restart pulses STVC_1-STVC_15 to the 15 pulse generators, respectively, to control 15 different horizontal lines. Based on the frame rate allocations, the position of applying the restart pulse may be selected from any of these 15 pulse generators for receiving the restart pulses STVC_1-STVC_15, to control the corresponding shift register to start to shift the scan pulse at a desired position, which may be a scan channel where the scan operation is switched to the HFR area from the LFR area. Note that FIG. 14 roughly illustrates the positions of the horizontal lines where the corresponding scan channels are applied with the restart pulses STVC_1-STVC_15. In fact, the restart pulses STVC_1-STVC_15 may be output to the GOA circuit of the display panel 140, where the GOA circuit is omitted in FIG. 14 for brevity.

Therefore, based on the deployments of the pulse generators, the frame rate may be allocated dynamically and flexibly. For example, in a first image frame, the area A2 may be allocated to the LFR area and the area A3 may be allocated to the HFR area, and thus the restart pulse STVC_3 may be output to the pulse generator of the area A3, to generate the scan pulse to be shifted by the shift registers in the scan channels corresponding to the area A3. In a second image frame, the area A3 may be allocated to the LFR area and the area A4 may be allocated to the HFR area, and thus the restart pulse STVC_4 may be output to the pulse generator of the area A4, to generate the scan pulse to be shifted by the shift registers in the scan channels corresponding to the area A4.

However, the display driver circuit outputting a great number of restart pulses (e.g., STVC_1-STVC_15) may significantly increase the pin count of the display driver circuit and complicate the wire connections between the display driver circuit and the display panel. In order to solve this problem, a demultiplexer (DEMUX) circuit may be included and applied to generate the restart pulses STVC_1-STVC_15, as shown in FIG. 15.

Figure 15:
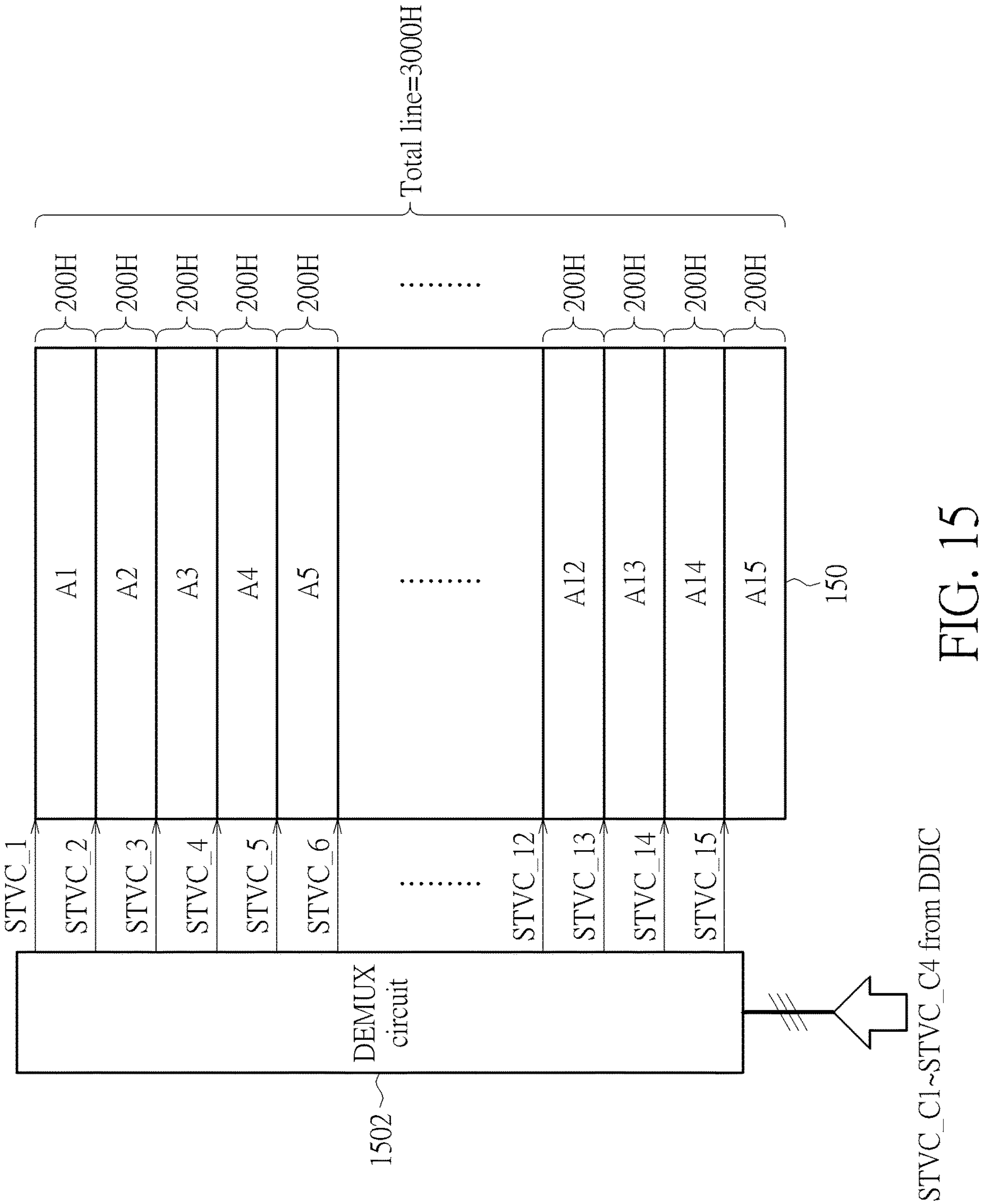
FIG. 15 is a schematic diagram of another display panel with a DEMUX circuit generating the restart pulses for the display panel.

In detail, FIG. 15 illustrates a display panel 150 similar to the display panel 140 shown in FIG. 14, and a DEMUX circuit 1502 may be coupled between the display driver circuit and the active area of the display panel 150. As shown in FIG. 15, the display driver circuit may only need to output 4 restart pulse control signals STVC_C1-STVC_C4 to the DEMUX circuit 1502. By decoding the 4 restart pulse control signals STVC_C1-STVC_C4, the DEMUX circuit 1502 is able to generate at most 16 restart pulses, among which 15 restart pulses STVC_1-STVC_15 are delivered to the display panel 150 for scan control. Similarly, the restart pulses STVC_1-STVC_15 generated by the DEMUX circuit 1502 may be output to the corresponding pulse generators in the GOA circuit to perform scan control. In an embodiment, the DEMUX circuit 1502 may be deployed in a non-active area of the display panel 150 and coupled between the display driver circuit and the GOA circuit of the display panel 150, or may be included in the GOA circuit of the display panel 150; hence, the pin count of the display driver circuit for transmitting the restart pulses may be significantly reduced.

Figure 16:
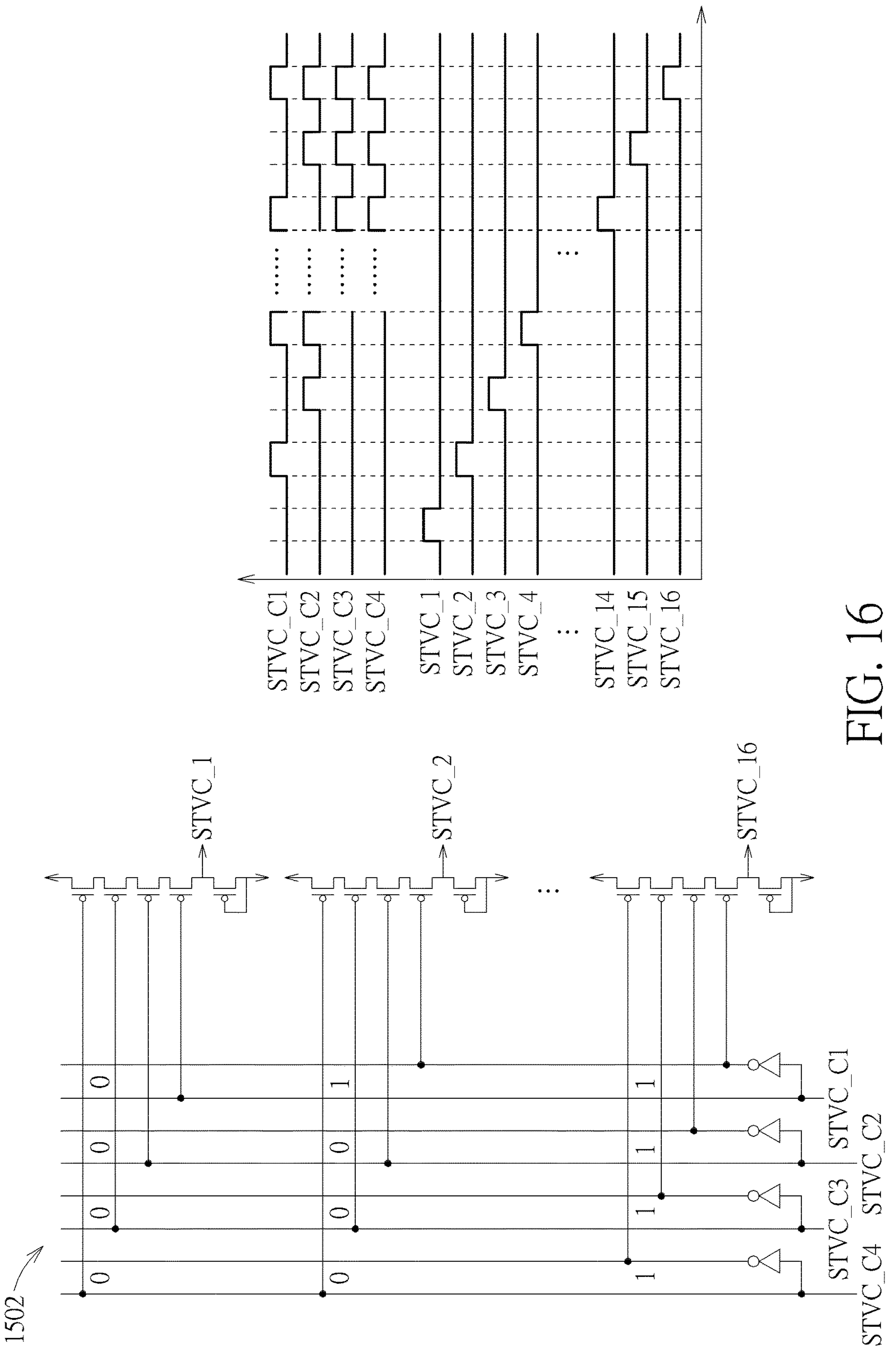
FIG. 16 illustrates an exemplary implementation of the DEMUX circuit.

More specifically, a pulse may be generated as one of 16 restart pulses STVC_1-STVC_16 based on the high/low combination of the 4 restart pulse control signals STVC_C1-STVC_C4, to drive the corresponding pulse generator to start the shifting of the scan pulse at the beginning of the HFR area. FIG. 16 illustrates an exemplary implementation of the DEMUX circuit 1502, which generates the restart pulses STVC_1-STVC_16 according to the restart pulse control signals STVC_C1-STVC_C4 received from the display driver circuit. In this embodiment, the DEMUX circuit 1502 may be operated as a decoder, which decodes the values (e.g., 1 or 0) of the restart pulse control signals STVC_C1-STVC_C4 to generate a pulse as one of the restart pulses STVC_1-STVC_16.

Note that the present invention aims at providing a GOA circuit in which the clock signals are stopped when the scan operation proceeds to the LFR area under the MFD applications, and a display driver circuit to output the clock signals in the HFR area and stop outputting the clock signals in the LFR area in an image frame. The detailed implementations of the GOA circuit provided in this disclosure are merely exemplary embodiments. For example, the pulse generator for restarting the pulse shift may be implemented in any possible manner, where the switch for generating the scan pulse may be implemented with a PMOS transistor or an NMOS transistor. The number of pulse generators and their positions are not limited to those described in this disclosure. In addition, the output enable circuits used for gating the scan signals provided in this disclosure are also exemplary embodiments. For example, if the GOA circuit is implemented in an LCD panel or any other panel without pixel compensation, there may be only one scan line coupled to a row of pixels. In such a situation, the output enable circuit in a scan channel may include only one logic gate to enable/disable the scan signal output, and the display driver circuit only needs to output one enable signal to the GOA circuit.

To sum up, the present invention provides a method of controlling a display panel and related display driver circuit and scan control circuit (e.g., GOA circuit) under the MFD application. According to the MFD application, an image frame may be divided into one or more HFR areas and one or more LFR areas according to the frame rate allocation. In order to achieve the purpose of power saving, the display driver circuit may stop outputting the clock signals to the GOA circuit in the LFR area where the pixels do not need to be refreshed. In the GOA circuit, a pulse generator for restarting the shift of a scan pulse may be deployed at any position; hence, each area of the image frame may be allocated as the HFR area or the LFR area to dynamically achieve different frame rates in every position. In addition, the frame rate allocation may be different in different image frames. The clock signals may be flexibly stopped and restarted and the restart pulses may be sent in appropriate positions to be adapted to the frame rate allocations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a display panel, the display panel performing a scan operation on an image frame with a first scan setting and a second scan setting, the method comprising: outputting a start pulse to the display panel when starting the scan operation; outputting a clock signal to the display panel when the scan operation is in the first scan setting; stopping outputting the clock signal to the display panel when the scan operation is in the second scan setting; and restarting to output the clock signal to the display panel when the scan operation is switched to the first scan setting from the second scan setting; wherein the first scan setting and the second scan setting are for display of the display panel, outputting a first enable signal to the display panel;

wherein the first enable signal is in a first state when the scan operation is in the first scan setting, and the first enable signal is in a second state when the scan operation is in the second scan setting, and outputting a second enable signal to the display panel; wherein the first enable signal transits from the first state to the second state when the scan operation proceeds to a second scan channel, and the second enable signal transits from the first state to the second state when the scan operation proceeds to a first scan channel adjacent to the second scan channel.

2. The method of claim 1, wherein the first enable signal enables a scan signal output when the scan operation is in the first scan setting, and disables the scan signal output when the scan operation is in the second scan setting.

3. The method of claim 1, wherein the step of stopping outputting the clock signal to the display panel comprises:

stopping outputting the clock signal at a first scan channel in a first image frame; and stopping outputting the clock signal at a second scan channel in a second image frame;

wherein the second scan channel is different from the first scan channel.

4. The method of claim 1, further comprising:

outputting a restart pulse to the display panel when the scan operation is switched to the first scan setting from the second scan setting.

5. The method of claim 4, wherein the display panel comprises a plurality of pulse generators, and the step of outputting the restart pulse to the display panel comprises:

outputting the restart pulse to a first pulse generator among the plurality of pulse generators in a first image frame; and outputting the restart pulse to a second pulse generator among the plurality of pulse generators in a second image frame;

wherein the second pulse generator is different from the first pulse generator.

6. The method of claim 1, wherein the clock signal does not toggle when the scan operation is in the second scan setting.

7. The method of claim 1, wherein the display panel is refreshed in the first scan setting, and is not refreshed in the second scan setting.

8. The method of claim 1, wherein the first scan setting corresponds to a high frame rate (HFR) area on the display panel, and the second scan setting corresponds to a low frame rate (LFR) area on the display panel, wherein a frame rate of the HFR area is greater than a frame rate of the LFR area.

9. A display driver circuit for controlling a display panel, the display panel performing a scan operation on an image frame with a first scan setting and a second scan setting, the display driver circuit being to: output a start pulse to the display panel when starting the scan operation; output a clock signal to the display panel when the scan operation is in the first scan setting; stop outputting the clock signal to the display panel when the scan operation is in the second scan setting; and restart to output the clock signal to the display panel when the scan operation is switched to the first scan setting from the second scan setting; wherein the first scan setting and the second scan setting are for display of the display panel, wherein the display driver circuit is further to output a first enable signal to the display panel; wherein the first enable signal is in a first state when the scan operation is in the first scan setting, and the first enable signal is in a second state when the scan operation is in the second scan setting; and wherein the display driver circuit is further to output a second enable signal to the display panel; wherein the first enable signal transits from the first state to the second state when the scan operation proceeds to a second scan channel, and the second enable signal transits from the first state to the second state when the scan operation proceeds to a first scan channel adjacent to the second scan channel.

10. The display driver circuit of claim 9, wherein the first enable signal enables a scan signal output when the scan operation is in the first scan setting, and disables the scan signal output when the scan operation is in the second scan.

11. The display driver circuit of claim 9, wherein the display driver circuit stops outputting the clock signal at a first scan channel in a first image frame and stops outputting the clock signal at a second scan channel in a second image frame, wherein the second scan channel is different from the first scan channel.

12. The display driver circuit of claim 9, further to output a restart pulse to the display panel when the scan operation is switched to the first scan setting from the second scan setting.

13. The display driver circuit of claim 12, wherein the display panel comprises a plurality of pulse generators, and the display driver circuit is further to:

output the restart pulse to a first pulse generator among the plurality of pulse generators in a first image frame; and output the restart pulse to a second pulse generator among the plurality of pulse generators in a second image frame;

wherein the second pulse generator is different from the first pulse generator.

14. The display driver circuit of claim 9, wherein the clock signal does not toggle when the scan operation is in the second scan setting.

15. The display driver circuit of claim 9, wherein the display panel is refreshed in the first scan setting, and is not refreshed in the second scan setting.

16. The display driver circuit of claim 9, wherein the first scan setting corresponds to a high frame rate (HFR) area on the display panel, and the second scan setting corresponds to a low frame rate (LFR) area on the display panel, wherein a frame rate of the HFR area is greater than a frame rate of the LFR area.

17. A scan control circuit of a display panel, comprising: a plurality of scan channels, each comprising: a shift register, to generate a scan pulse according to a start pulse and a clock signal; and an output enable circuit, coupled to the shift register, to output a scan signal according to the scan pulse and an enable signal; and at least one pulse generator, each coupled to the shift register of one of the plurality of scan channels, wherein the display panel performs a scan operation on an image frame with a first scan setting and a second scan setting, and the enable signal is in a first state when the scan operation is in the first scan setting, and the enable signal is in a second state when the scan operation is in the second scan setting, and wherein the enable signal enables a scan signal output when the scan operation is in the first scan setting, and disables the scan signal output when the scan operation is in the second scan setting.

18. The scan control circuit of claim 17, wherein a number of the at least one pulse generator is less than a number of the plurality of scan channels.

19. The scan control circuit of claim 17, wherein each of the at least one pulse generator comprises a switch.

20. The scan control circuit of claim 19, wherein the switch comprises a transistor, which comprises:

a first terminal, coupled to the shift register;

a second terminal, coupled to a voltage supply terminal; and a control terminal, coupled to an output terminal of a display driver circuit.

21. The scan control circuit of claim 19, wherein the switch comprises a transistor, which comprises:

a first terminal, coupled to the shift register;

a second terminal, coupled to an output terminal of a display driver circuit; and a control terminal, coupled to the output terminal of the display driver circuit.

22. The scan control circuit of claim 17, wherein each of the at least one pulse generator is coupled between an output terminal of a first shift register and an input terminal of a second shift register, wherein the first shift register and the second shift register are in two adjacent scan channels among the plurality of scan channels, respectively.

23. The scan control circuit of claim 17, wherein each of the at least one pulse generator generates a scan pulse according to a restart pulse received from a display driver circuit.

24. The scan control circuit of claim 17, wherein the output enable circuit comprises a logic gate, to output the scan signal by performing a logic operation on the scan pulse and the enable signal.

25. The scan control circuit of claim 17, wherein the clock signal does not toggle when the scan operation is in the second scan setting.

26. The scan control circuit of claim 17, wherein the shift register stops shifting the scan pulse when the scan operation is in the second scan setting.

27. The scan control circuit of claim 17, wherein the shift register starts to shift the scan pulse when the scan operation is switched to the first scan setting 10 from the second scan setting.

28. The scan control circuit of claim 17, wherein the shift register starts to shift the scan pulse at a first scan channel among the plurality of scan channels in a first image frame, and the shift register starts to shift the scan pulse at a second scan channel among the plurality of scan channels in a second image frame, wherein the second scan channel is different from the first scan channel.

29. The scan control circuit of claim 17, wherein an input terminal of the shift register of a second scan channel among the plurality of scan channels is coupled to an output terminal of the shift register of a first scan channel among the plurality of scan channels.

30. The scan control circuit of claim 17, wherein an input terminal of the shift register of a second scan channel among the plurality of scan channels is coupled to an output terminal of the output enable circuit of a first scan channel among the plurality of scan channels.

31. The scan control circuit of claim 17, wherein the at least one pulse generator comprises a plurality of pulse generators, and the scan control circuit further comprises:

a demultiplexer circuit, coupled between the display panel and a display driver circuit, to generate a plurality of restart pulses according to a plurality of restart pulse control signals received from the display driver circuit, and output the plurality of restart pulses to the plurality of pulse generators, respectively.

32. A method of controlling a display panel, the display panel performing a scan operation on an image frame with a first scan setting and a second scan setting, the method comprising:

outputting a start pulse to the display panel when starting the scan operation;

outputting a clock signal to the display panel when the scan operation is in the first scan setting; stopping outputting the clock signal to the display panel when the scan operation is in the second scan setting; and outputting a first enable signal to the display panel; wherein the first enable signal is in a first state when the scan operation is in the first scan setting, and the first enable signal is in a second state when the scan operation is in the second scan setting, outputting a second enable signal to the display panel; wherein the first enable signal transits from the first state to the second state when the scan operation proceeds to a second scan channel, and the second enable signal transits from the first state to the second state when the scan operation proceeds to a first scan channel adjacent to the second scan channel.

33. The method of claim 32, wherein the first enable signal enables a scan signal output when the scan operation is in the first scan setting, and disables the scan signal output when the scan operation is in the second scan setting.

34. The method of claim 32, wherein the step of stopping outputting the clock signal to the display panel comprises:

stopping outputting the clock signal at a first scan channel in a first image frame; and stopping outputting the clock signal at a second scan channel in a second image frame;

wherein the second scan channel is different from the first scan channel.

35. The method of claim 32, further comprising:

restarting to output the clock signal and outputting a restart pulse to the display panel when the scan operation is switched to the first scan setting from the second scan setting.

36. The method of claim 35, wherein the display panel comprises a plurality of pulse generators, and the step of outputting the restart pulse to the display panel comprises:

outputting the restart pulse to a first pulse generator among the plurality of pulse generators in a first image frame; and outputting the restart pulse to a second pulse generator among the plurality of pulse generators in a second image frame;

wherein the second pulse generator is different from the first pulse generator.

37. The method of claim 32, wherein the clock signal does not toggle when the scan operation is in the second scan setting.

38. The method of claim 32, wherein the display panel is refreshed in the first scan setting, and is not refreshed in the second scan setting.

39. The method of claim 32, wherein the first scan setting corresponds to a high frame rate (HFR) area on the display panel, and the second scan setting corresponds to a low frame rate (LFR) area on the display panel, wherein a frame rate of the HFR area is greater than a frame rate of the LFR area.

40. A display driver circuit for controlling a display panel, the display panel performing a scan operation on an image frame with a first scan setting and a second scan setting, the display driver circuit being to: output a start pulse to the display panel when starting the scan operation; output a clock signal to the display panel when the scan operation is in the first scan setting; stop outputting the clock signal to the display panel when the scan operation is in the second scan setting; and output a first enable signal to the display panel; wherein the first enable signal is in a first state when the scan operation is in the first scan setting, and the first enable signal is in a second state when the scan operation is in the second scan setting, wherein the display driver circuit is further to output a second enable signal to the display panel; wherein the first enable signal transits from the first state to the second state when the scan operation proceeds to a second scan channel, and the second enable signal transits from the first state to the second state when the scan operation proceeds to a first scan channel adjacent to the second scan channel.

41. The display driver circuit of claim 40, wherein the first enable signal enables a scan signal output when the scan operation is in the first scan setting, and disables the scan signal output when the scan operation is in the second scan setting.

42. The display driver circuit of claim 40, wherein the display driver circuit stops outputting the clock signal at a first scan channel in a first image frame and stops outputting the clock signal at a second scan channel in a second image frame, wherein the second scan channel is different from the first scan channel.

43. The display driver circuit of claim 40, further to restart to output the clock signal and output a restart pulse to the display panel when the scan operation is switched to the first scan setting from the second scan setting.

44. The display driver circuit of claim 43, wherein the display panel comprises a plurality of pulse generators, and the display driver circuit is further to:

output the restart pulse to a first pulse generator among the plurality of pulse generators in a first image frame; and output the restart pulse to a second pulse generator among the plurality of pulse generators in a second image frame;

wherein the second pulse generator is different from the first pulse generator.

45. The display driver circuit of claim 40, wherein the clock signal does not toggle when the scan operation is in the second scan setting.

46. The display driver circuit of claim 40, wherein the display panel is refreshed in the first scan setting, and is not refreshed in the second scan setting.

47. The display driver circuit of claim 40, wherein the first scan setting corresponds to a high frame rate (HFR) area on the display panel, and the second scan setting corresponds to a low frame rate (LFR) area on the display panel, wherein a frame rate of the HFR area is greater than a frame rate of the LFR area.

* * * * *